US012792606B2

(12) United States Patent

Lagrange Moutinho Dos Reis et al.

(10) Patent No.: US 12,792,606 B2

(45) Date of Patent: *Nov. 10, 2026

(54) STORAGE DEVICE ADAPTER TO ACCELERATE DATABASE TEMPORARY TABLE PROCESSING

(71) Applicant: Samsung Electronics Co., Ltd., Suwon-si (KR)

(72) Inventors: Veronica Lagrange Moutinho Dos Reis, Cupertino, CA (US); Vishwanath Maram, San Jose, CA (US); Huan Li, San Jose, CA (US); Howard Butler, San Jose, CA (US); Oscar P. Pinto, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/826,174

(22) Filed: Sep. 5, 2024

(65) Prior Publication Data

US 2024/0427769 A1 Dec. 26, 2024

Related U.S. Application Data

(63) Continuation of application No. 17/178,231, filed on Feb. 17, 2021, now Pat. No. 12,093,258.

(Continued)

(51) Int. Cl.

*G06F 16/2453* (2019.01)

*G06F 16/22* (2019.01)

(52) U.S. Cl.

CPC .... *G06F 16/24549* (2019.01); *G06F 16/2282* (2019.01)

(58) Field of Classification Search

CPC ...................... G06F 16/24549; G06F 16/2282

(Continued)

(56) References Cited

U.S. PATENT DOCUMENTS 5,860,157 A 1/1999 Cobb 7,606,954 B2 10/2009 Brink et al.

(Continued)

FOREIGN PATENT DOCUMENTS

CN 101206633 A 6/2008

CN 104657308 A 5/2015

(Continued)

OTHER PUBLICATIONS

Awad, Amro et al., "Non-Volatile Memory Host Controller Interfaces Performance Analysis in High-Performance I/O Systems," 2015 IEEE International Symposium on Performance Analysis of Systems and Software (ISPASS), Philadelphia, PA, USA, 2015, 11 pages.

(Continued)

*Primary Examiner* — Hung T Vy

(74) *Attorney, Agent, or Firm* — Renaissance IP Law Group LLP

(57) ABSTRACT

A system is described. The system may include a storage device, which may include storage for data and a controller to write the data to the storage and to read the data from the storage. The storage device may also include an accelerator implementing at least one operation on files stored on the storage device. These operations may be drawn from a set including a merge operation and a split operation.

20 Claims, 19 Drawing Sheets

Related U.S. Application Data

(60) Provisional application No. 63/125,381, filed on Dec. 14, 2020.

(58) Field of Classification Search
USPC .......................................................... 707/715
See application file for complete search history.

(56) References Cited

U.S. PATENT DOCUMENTS

| | | | |
|---|---|---|---|
| 7,860,930 | B2 | 12/2010 | Freimuth et al. |
| 8,275,897 | B2 | 9/2012 | Fallon |
| 8,504,750 | B1 | 8/2013 | Sonksen et al. |
| 8,700,834 | B2 | 4/2014 | Horn et al. |
| 8,924,661 | B1 | 12/2014 | Shachar et al. |
| 9,110,706 | B2 | 8/2015 | Yu et al. |
| 9,268,695 | B2 | 2/2016 | Weiner et al. |
| 9,619,167 | B2 | 4/2017 | Khan et al. |
| 9,715,351 | B2 | 7/2017 | Patocka et al. |
| 9,772,793 | B2 | 9/2017 | Sridharan et al. |
| 9,773,042 | B1 | 9/2017 | Li |
| 9,852,779 | B2 | 12/2017 | Lee |
| 9,898,312 | B2 | 2/2018 | Chamberlain et al. |
| 9,933,976 | B2 | 4/2018 | Tsujimoto et al. |
| 9,946,659 | B2 | 4/2018 | Dittmann |
| 10,025,747 | B2 | 7/2018 | Swarbrick et al. |
| 10,067,676 | B2 | 9/2018 | Pratt |
| 10,110,411 | B2 | 10/2018 | Gulati |
| 10,120,608 | B2 | 11/2018 | Khan et al. |
| 10,161,993 | B2 | 12/2018 | Frediani et al. |
| 10,210,121 | B2 | 2/2019 | Chu et al. |
| 10,282,308 | B2 | 5/2019 | Jayasena et al. |
| 10,394,746 | B2 | 8/2019 | Kachare et al. |
| 10,467,176 | B2 | 11/2019 | Morishita et al. |
| 10,534,552 | B2 | 1/2020 | Hu et al. |
| 10,585,819 | B2 | 3/2020 | Kachare et al. |
| 10,599,568 | B2 | 3/2020 | Shifer |
| 10,860,508 | B2 | 12/2020 | Bolkhovitin et al. |
| 12,093,258 | B2 * | 9/2024 | Lagrange Moutinho Dos Reis .... G06F 16/2282 |
| 2007/0073941 | A1 | 3/2007 | Brink et al. |
| 2009/0307416 | A1 | 12/2009 | Luo et al. |
| 2012/0144098 | A1 | 6/2012 | Yang et al. |
| 2012/0310917 | A1 * | 12/2012 | Sheinin ............. G06F 16/24561 707/E17.054 |
| 2013/0145375 | A1 | 6/2013 | Kang |
| 2013/0343181 | A1 | 12/2013 | Stroud et al. |
| 2014/0052892 | A1 | 2/2014 | Klein et al. |
| 2014/0365714 | A1 | 12/2014 | Sweere et al. |
| 2015/0149695 | A1 | 5/2015 | Khan et al. |
| 2015/0220354 | A1 | 8/2015 | Nair |
| 2015/0220409 | A1 | 8/2015 | Shao et al. |
| 2015/0254003 | A1 | 9/2015 | Lee et al. |
| 2016/0094619 | A1 | 3/2016 | Khan et al. |
| 2016/0292101 | A1 | 10/2016 | Egi et al. |
| 2016/0342545 | A1 | 11/2016 | Arai et al. |
| 2016/0369231 | A1 | 12/2016 | Vacher et al. |
| 2017/0091127 | A1 | 3/2017 | Khan et al. |
| 2017/0177270 | A1 | 6/2017 | Nakagawa et al. |
| 2017/0285968 | A1 | 10/2017 | Jung et al. |
| 2018/0052766 | A1 | 2/2018 | Mehra et al. |
| 2018/0081569 | A1 | 3/2018 | Kan et al. |
| 2019/0042513 | A1 * | 2/2019 | Fleming, Jr. ........ G06F 9/30145 |
| 2019/0212918 | A1 | 7/2019 | Wang et al. |
| 2020/0371960 | A1 | 11/2020 | Bhoria et al. |
| 2021/0303306 | A1 | 9/2021 | Buyuktosunoglu et al. |
| 2022/0012217 | A1 | 1/2022 | Dörre et al. |

FOREIGN PATENT DOCUMENTS

| | | | |
|---|---|---|---|
| CN | 105229481 | A | 1/2016 |
| CN | 105659222 | A | 6/2016 |
| CN | 105677595 | A | 6/2016 |
| CN | 106126447 | A | 11/2016 |
| CN | 106371773 | A | 2/2017 |
| KR | 20190105492 | A | 9/2019 |
| TW | 201007452 | A | 2/2010 |
| TW | 201142587 | A | 12/2011 |
| TW | 201214139 | A | 4/2012 |
| TW | 201230038 | A | 7/2012 |
| TW | 201727506 | A | 8/2017 |
| TW | 201805825 | A | 2/2018 |
| TW | 201807615 | A | 3/2018 |
| WO | 2015166540 | A1 | 11/2015 |
| WO | 2016135875 | A1 | 9/2016 |

OTHER PUBLICATIONS

Final Office Action for U.S. Appl. No. 17/178,231, mailed Jul. 28, 2023.
Final Office Action for U.S. Appl. No. 17/187,735, mailed Nov. 14, 2022.
Jun, Sang-Woo, "Scalable Multi-Access Flash Store for Big Data Analytics", Proceedings of the 2014 ACM/SIGDA International Symposium on Field-Programmable Gate Arrays, ACM 2014, found via Google Scholar (url:https://dspace.mit.edu/bitstream/handle/1721.1/87947/880415120-MIT.pdf;sequence=2), Feb. 2014, 49 pages.
Koo, Gunjae et al., "Summarizer: Trading Communication with Computing Near Storage," 2017 50th Annual IEEE/ACM International Symposium on Microarchitecture (MICRO), Cambridge, MA, USA, Oct. 14-18, 2017, 13 pages.
Moorthy, Theepan et al., "IO and Data Management for Infrastructure as a Service FPGA Accelerators," Journal of Cloud Computing, Advances, Systems and Applications, (2017), 6:20, found via Google Scholar (url: https://link.springer.com/article/10.1186/s13677-017-0089-9), published Aug. 22, 2017, 23 pages.
Notice of Allowance for U.S. Appl. No. 16/122,865, filed Oct. 17, 2019.
Notice of Allowance for U.S. Appl. No. 16/124,179, mailed Oct. 21, 2019.
Notice of Allowance for U.S. Appl. No. 16/124,182, mailed Nov. 1, 2019.
Notice of Allowance for U.S. Appl. No. 16/124,183, mailed Oct. 30, 2019.
Notice of Allowance for U.S. Appl. No. 16/752,612 mailed Mar. 24, 2021.
Notice of Allowance for U.S. Appl. No. 16/752,612, filed Dec. 16, 2020.
Notice of Allowance for U.S. Appl. No. 17/178,231, mailed May 14, 2024.
Notice of Allowance for U.S. Appl. No. 17/187,735, mailed Aug. 8, 2023.
Office Action for U.S. Appl. No. 16/122,865, mailed Jun. 25, 2019.
Office Action for U.S. Appl. No. 16/124,179, mailed Jun. 25, 2019.
Office Action for U.S. Appl. No. 16/124,182, mailed Jun. 25, 2019.
Office Action for U.S. Appl. No. 16/124,183, mailed Jun. 25, 2019.
Office Action for U.S. Appl. No. 16/752,612, mailed Jul. 1, 2020.
Office Action for U.S. Appl. No. 17/178,231, mailed Aug. 1, 2022.
Office Action for U.S. Appl. No. 17/178,231, mailed Dec. 21, 2023.
Office Action for U.S. Appl. No. 17/178,231, mailed Jan. 26, 2023.
Office Action for U.S. Appl. No. 17/187,735, mailed Apr. 21, 2023.
Office Action for U.S. Appl. No. 17/187,735, mailed Mar. 9, 2022.
Office Action for U.S. Appl. No. 18/544,415, mailed Feb. 11, 2025.
Tavakkol, Arash et al., "Design for Scalability in Enterprise SSDs," Proceedings of the 23rd International Conference on Parallel Architectures and Compilation, ACM, 2014, found via ACM Digital Library and freely obtained via Google Scholar (url: https://www.inf.ethz.ch/personal/arash.tavakkol/downloads/papers/A.Tavakkol-PACT2014.pdf), Aug. 2014, 13 pages.
Final Office Action for U.S. Appl. No. 18/544,415, mailed Sep. 2, 2025.
Notice of Allowance for U.S. Appl. No. 18/544,415, mailed Jan. 21, 2026.

* cited by examiner

STORAGE DEVICE ADAPTER TO ACCELERATE DATABASE TEMPORARY TABLE PROCESSING

RELATED APPLICATION DATA

This application is a continuation of U.S. patent application Ser. No. 17/178,231, filed Feb. 17, 2021, now allowed, which claims the benefit of U.S. Provisional Patent Application Ser. No. 63/125,381, filed Dec. 14, 2020, both of which are incorporated by reference herein for all purposes.

FIELD

The disclosure relates generally to storage devices, and more particularly to improving the processing of temporary tables.

BACKGROUND

Database queries may involve three general processes: scan/filter the database to identify data that may be of interest; process the data identified using the scan/filter process; and return a result of the query. Databases may be large, and may exceed available Dynamic Random Access Memory (DRAM): for example, the temporary tables generated by the scan/filter process may be larger than available DRAM. Since these temporary tables may be stored until the result of the query is determined, these temporary tables may be written to other storage and loaded into DRAM as needed for processing. As a result, a significant amount of the time spent processing the data may be spent writing data to and reading data from storage.

A need remains to improve the processing of temporary tables, to reduce the time required to resolve a database query.

DETAILED DESCRIPTION

Figure 1:
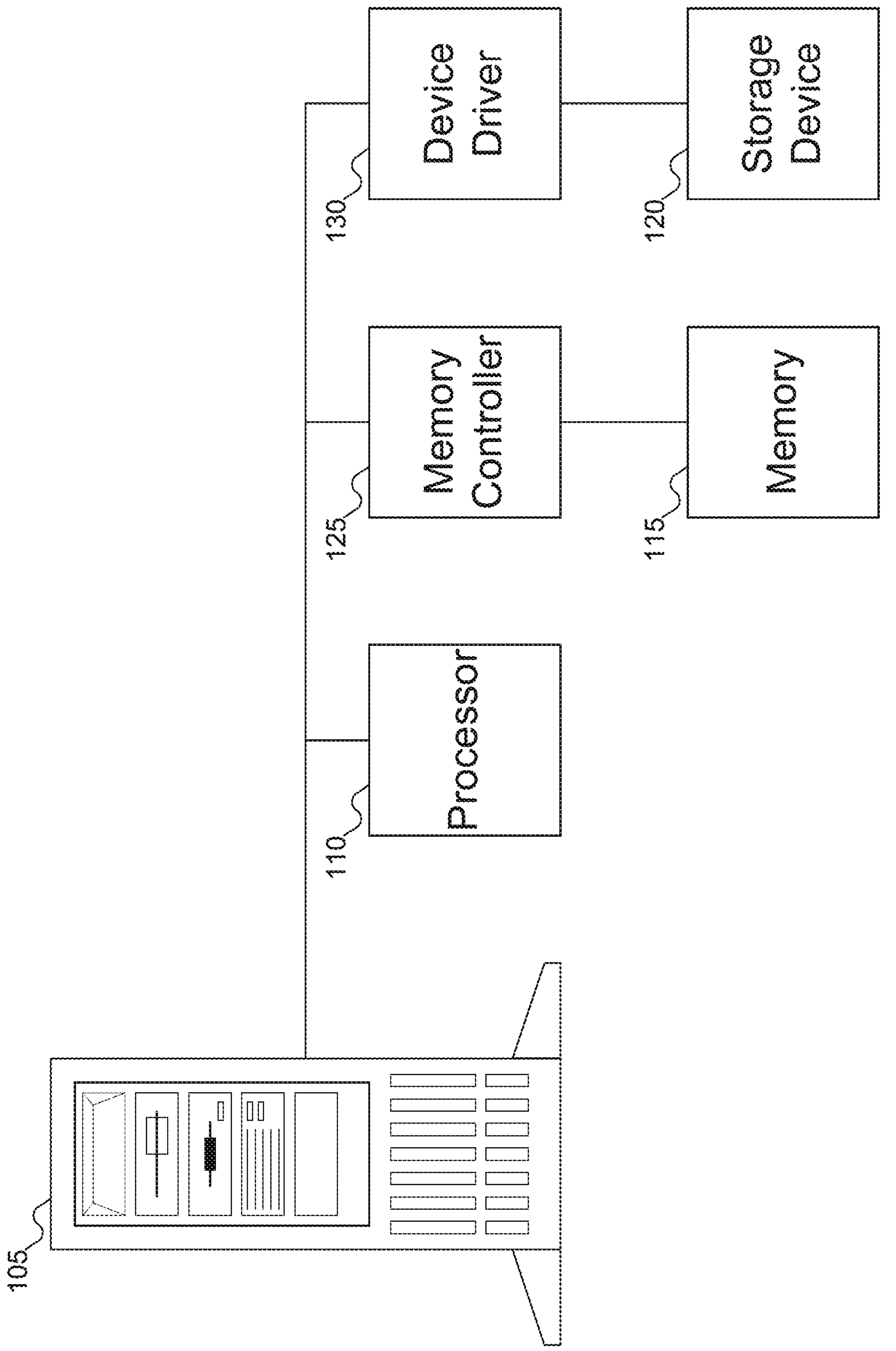
FIG. 1 shows a system including a storage device supporting accelerator operations to process temporary tables, according to embodiments of the disclosure.

Reference will now be made in detail to embodiments of the disclosure, examples of which are illustrated in the accompanying drawings. In the following detailed description, numerous specific details are set forth to enable a thorough understanding of the disclosure. It should be understood, however, that persons having ordinary skill in the art may practice the disclosure without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the disclosure.

The terminology used in the description of the disclosure herein is for the purpose of describing particular embodiments only and is not intended to be limiting of the disclosure. As used in the description of the disclosure and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

When database queries result in temporary tables, particularly temporary tables that are too large to fit in the host memory, the temporary tables may need to be saved to secondary storage, such as a hard disk drive or a Solid State Drive (SSD). Another device, such as the host, may then read portions of the temporary tables into memory and write portions back to the secondary storage after processing the portions read into memory. These operations to move temporary table data back and forth between the host memory and the secondary storage may increase the latency of the command, potentially on the order of minutes or hours.

Input/output (I/O) operations may frequently be the bottleneck for "big data" related computing situations, such as online analytical processing (OLAP) operations. Some near storage optimizations for database analytics may work on the initial stages of the computation (e.g., via SCAN/

FILTER/PROJECT operations). But where the problem happens throughout the computation (e.g., the beginning, middle, and/or end of the computation) when the intermediate data generated by the query is too big to fit in memory, existing near-storage solutions may not address the problem.

An accelerator adapter may be used to minimize the back-and-forth of activity between host and device to process temporary table data, thus improving query response times. Embodiments of the disclosure may decrease the I/O exchange between the host and the device. In practice, the data that is stored temporarily may be either merged with other temporary data, or may be split according to some Key value. The host may "delegate" at least part of these tasks to the device. The accelerator adapter may be generic enough that it may be used by various database engines, and at the same time powerful enough to improve response times for queries falling in this category.

By having the device collaborate with the host in executing these "temporary table" operations, queries too big to fit in the available host Dynamic Random Access Memory (DRAM) may be performed more efficiently/expeditiously. Once the host pre-processes and creates these intermediate temporary files, the near storage tasks may be simplified and become more well-defined. Once the host passes input parameters, including, for example, file descriptor (FD) information to the device, the operations requested may be executed locally and seamlessly using Peer-to-Peer (P2P) technology. All of the operations proposed may be "streamed", and may not require large amounts of device DRAM.

For example, when performing a merge of two files, after the host creates sorted files FILE1 and FILE2, the host may call the adapter Merge function to merge these two files into file FILE3.

In another example, when splitting a table into two tables, after the host creates temporary file FILE1, the host may call the adapter Split function with a Key and two output file names. The adapter Split function may then split FILE1 into two files based on the Key value: lines/rows smaller than or equal to Key may be copied to one file and lines/rows larger than KEY may be copied to the other file.

Finally, the adapter function Histogram may be a generalization of Split. Histogram's input parameter may be a set of Keys and an equal number, plus one, of output files. Lines/rows from the input file may be copied to one of the output files based on its Key value. The final result may be a set of files each containing a key range. Memory available on the device may determine the upper limit on number of keys per Histogram call.

The accelerator adapter may be called by drivers or other code in the host. The device may perform the operations requested near-storage, saving both host processor cycles, host memory, and I/O between host and device.

The following example pseudo-code demonstrates each of the mechanisms in this disclosure. While the details are not limited, the implementations may be adapted to suit the specific database engine. Other aspects may include record format, encryption, compression and other storage services applied in the data path.

1. Merge two pre-ordered files.

INPUT parameters: sorted files FILE-IN-1 and FILE-IN-2; Sort order (DESC/ASC).

OUTPUT parameter: FILE-OUT.

Adapter pseudo-code:

```
IF Input parameter "Sort Order" is DESC
  THEN SortOrder = "<="
  ELSE SortOrder = ">=";
Rec1 = Read (FILE-IN-1);
Rec2 = Read (FILE-IN-2);
While (NOT EOF FILE-IN-1 and NOT EOF FILE-IN-2) {
  While (Rec1 [SortOrder] Rec2) {
      Write (FILE-OUT, Rec1);
      Rec1 = Read (FILE-IN-1);
    }
    Write (FILE-OUT, Rec2);
    Rec2 = Read (FILE-IN-2);
  }
IF ONE OF THE IN FILES STILL HAVE RECORDS, WRITE THEM
TO FILE-OUT
```

2. Split one file in two based on a key value.

INPUT parameters: FILE-IN; KEY.

OUTPUT parameters: FILE-OUT-1; FILE-OUT-2.

Adapter pseudo-code:

```
Rec1 = Read (FILE-IN);
WHILE (NOT EOF (FILE-IN)) {
  IF (Rec1 <= KEY)
  THEN Write (FILE-OUT-1, Rec1)
  ELSE Write (FILE-OUT-2, Rec1);
  Rec1 = Read (FILE-IN);
  }
```

3. Histogram may be implemented as a generalization of Split. The input may be a small array of key values. The output may be either a directory name or a file prefix to be used for the various files.

Although the invention disclosure targets an SSD, embodiments of the disclosure may extent to other storage devices, such as hard disk drives. Other embodiments may also include a combination of one or more Non-Volatile Memory Express (NVMe) SSDs and an accelerator that are connected in a different configuration than an SSD, that permits offloading the data-path that would have used host memory and host central processing unit (CPU) cycles to the storage device.

FIG. 1 shows a system including a storage device supporting accelerator operations to process temporary tables, according to embodiments of the disclosure. In FIG. 1, machine 105 may include processor 110, memory 115, and storage device 120. Processor 110 may be any variety of processor. (Processor 110, along with the other components discussed below, are shown outside the machine for ease of illustration: embodiments of the disclosure may include these components within the machine.) While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 115 may also be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may also support an operating system under which various applications may be running. These applications may issue requests (which may also be termed commands) to read data from or write data to either memory 115 or storage device 120. Storage device 120 may be accessed using device driver 130. While FIG. 1 uses the generic term "storage device", embodiments of the disclosure may include any storage device formats that may benefit from streaming of data using compression characteristics, examples of which may include hard disk drives and Solid State Drives (SSDs). Any reference to "SSD" below should be understood to include such other embodiments of the disclosure.

Figure 2:
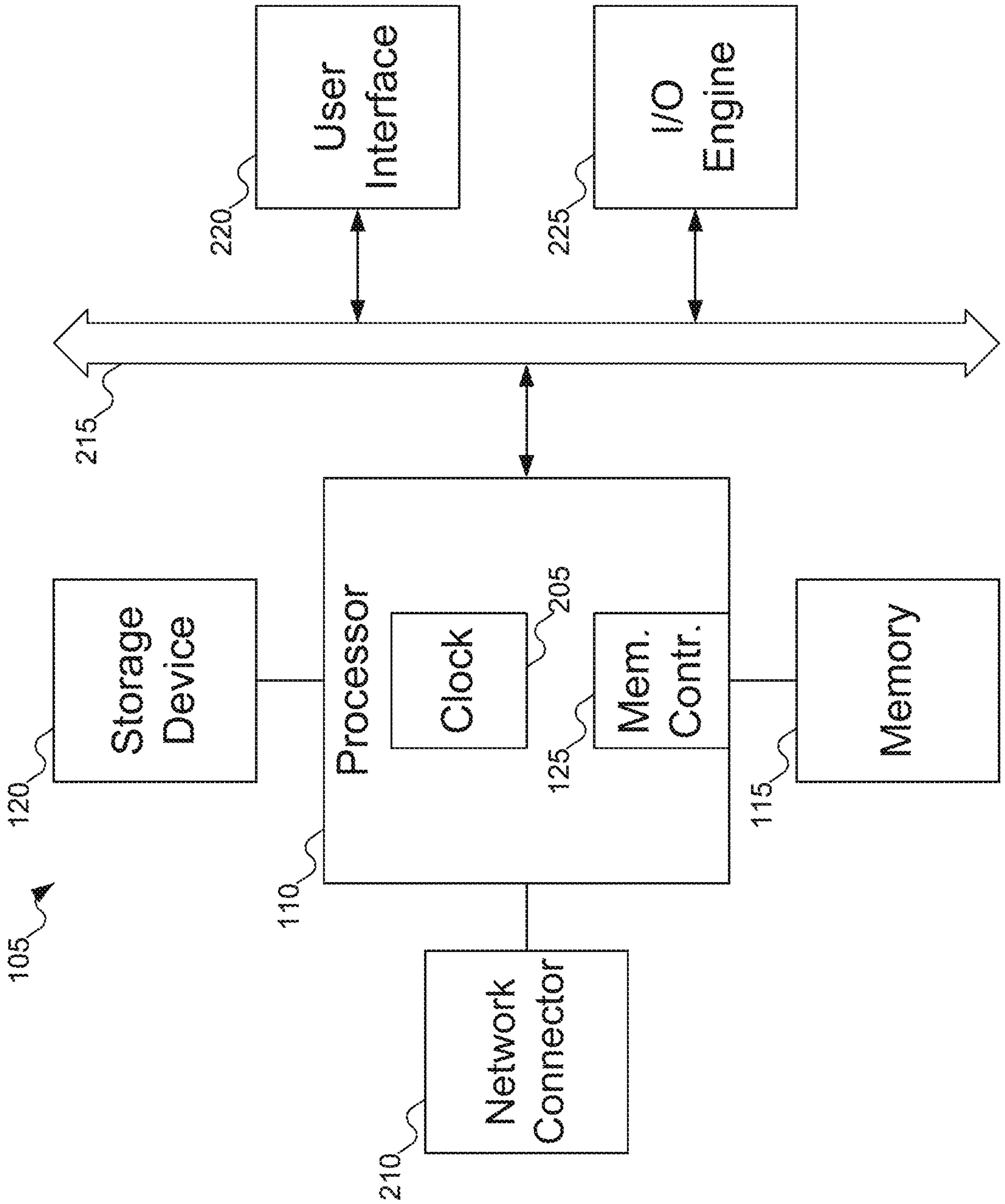
FIG. 2 shows details of the machine of FIG. 1, according to embodiments of the disclosure.

FIG. 2 shows details of the machine of FIG. 1, according to embodiments of the disclosure. In FIG. 2, typically, machine 105 includes one or more processors 110, which may include memory controllers 125 and clocks 205, which may be used to coordinate the operations of the components of the machine. Processors 110 may also be coupled to memories 115, which may include random access memory (RAM), read-only memory (ROM), or other state preserving media, as examples. Processors 110 may also be coupled to storage devices 120, and to network connector 210, which may be, for example, an Ethernet connector or a wireless connector. Processors 110 may also be connected to buses 215, to which may be attached user interfaces 220 and Input/Output (I/O) interface ports that may be managed using I/O engines 225, among other components.

Figure 3:
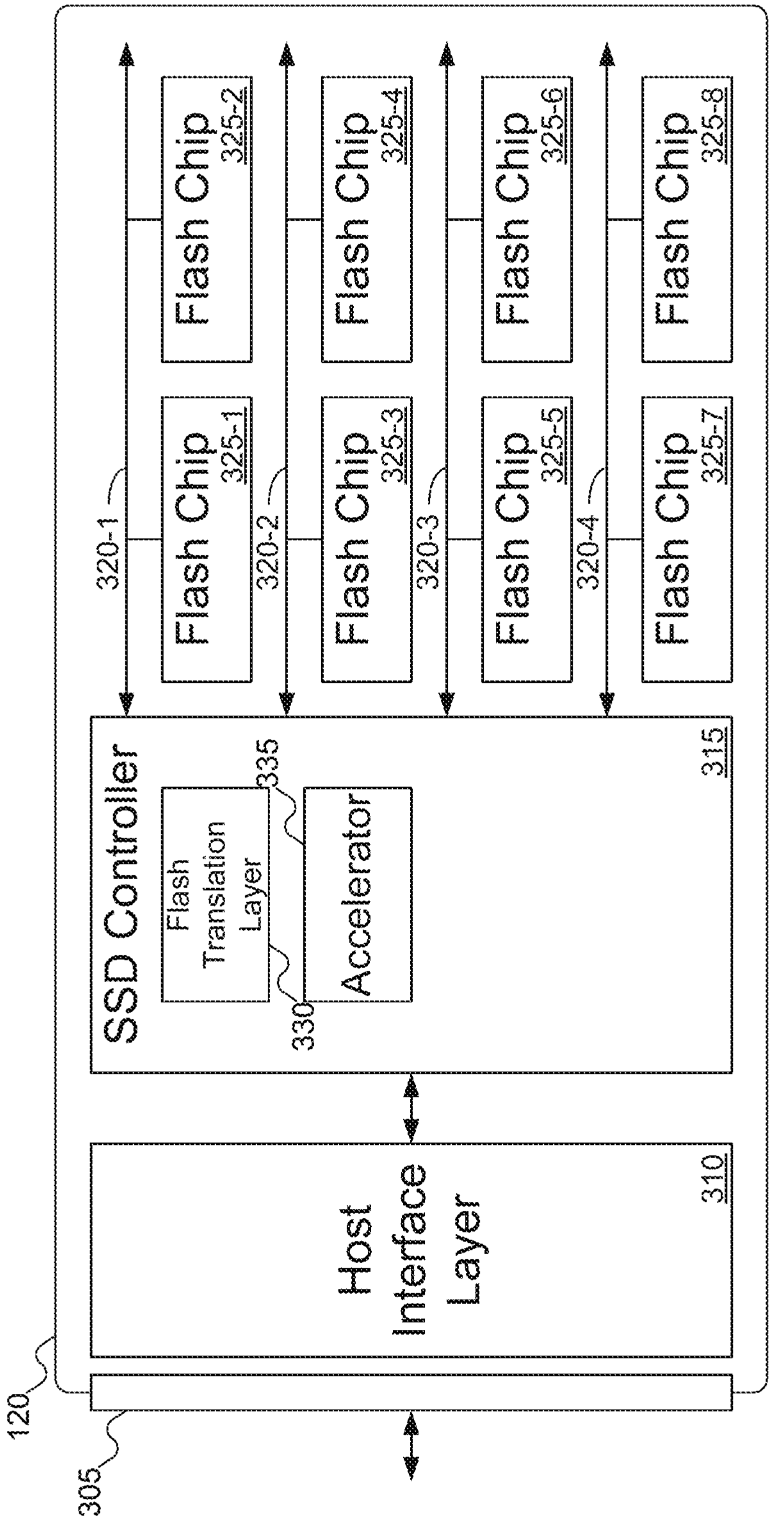
FIG. 3 shows details of a Solid State Drive (SSD) that may be used as the storage device of FIG. 1, according to embodiments of the disclosure.

FIG. 3 shows details of an SSD that may be used as storage device 120 of FIG. 1, according to embodiments of the disclosure. In FIG. 3, SSD 120 may include interface 305. Interface 305 may be an interface used to connect SSD 120 to machine 105 of FIG. 1. SSD 120 may include more than one interface 305: for example, one interface might be used for block-based read and write requests, and another interface might be used for key-value read and write requests. While FIG. 3 suggests that interface 305 is a physical connection between SSD 120 and machine 105 of FIG. 1, interface 305 may also represent protocol differences that may be used across a common physical interface. For example, SSD 120 might be connected to machine 105 using a U.2 or an M.2 connector, but may support block-based requests and key-value requests: handling the different types of requests may be performed by a different interface 305.

SSD 120 may also include host interface layer 310, which may manage interface 305. If SSD 120 includes more than one interface 305, a single host interface layer 310 may manage all interfaces, SSD 120 may include a host interface layer for each interface, or some combination thereof may be used. Host interface layer 310 may manage receiving requests across interface 305 and sending results back across interface 305.

SSD 120 may also include SSD controller 315, various channels 320-1, 320-2, 320-3, and 320-4, along which various flash memory chips 325-1, 325-2, 325-3, 325-4, 325-3, 325-6, 325-7, and 325-8 may be arrayed. SSD controller 315 may manage sending read requests and write requests to flash memory chips 325-1 through 325-8 along channels 320-1 through 320-4. Although FIG. 3 shows four channels and eight flash memory chips, embodiments of the disclosure may include any number (one or more, without bound) of channels including any number (one or more, without bound) of flash memory chips.

Within each flash memory chip, the space may be organized into blocks, which may be further subdivided into pages, and which may be grouped into superblocks. The page is typically the smallest unit of data that may be read or written on an SSD. Page sizes may vary as desired: for example, a page may be 4 KB of data. If less than a full page is to be written, the excess space is "unused".

While pages may be written and read, SSDs typically do not permit data to be overwritten: that is, existing data may be not be replaced "in place" with new data. Instead, when data is to be updated, the new data is written to a new page on the SSD, and the original page is invalidated (marked ready for erasure). Thus, SSD pages typically have one of three states: free (ready to be written), valid (containing valid data), and invalid (no longer containing valid data, but not usable until erased) (the exact names for these states may vary).

But while pages may be written and read individually, the block is the basic unit of data that may be erased. That is, pages are not erased individually: all the pages in a block are typically erased at the same time. For example, if a block contains 256 pages, then all 256 pages in a block are erased at the same time. This arrangement may lead to some management issues for the SSD: if a block is selected for erasure that still contains some valid data, that valid data may need to be copied to a free page elsewhere on the SSD before the block may be erased. (In some embodiments of the disclosure, the unit of erasure may differ from the block: for example, it may be a superblock, which may be a set of multiple blocks.)

SSD controller 315 may include flash translation layer 330 (which may be termed more generally a logical-to-physical translation layer, for storage devices that do not use flash storage), and accelerator 335. Flash translation layer 330 may handle translation of logical block addresses (LBAs) or other logical IDs (as used by processor 110 of FIG. 1) and physical block addresses (PBAs) or other physical addresses where data is stored in flash chips 325-1 through 325-8. Accelerator 335 may implement various functions that may be requested by machine 105 of FIG. 1 and which may be performed on temporary tables generated during the processing of a database query. Details of example functions that may be implemented by accelerator 335 are discussed below with reference to FIGS. 5-6B and 13-15B. Accelerator 335 may be implemented using, for example, a Field Programmable Gate Array (FPGA), an Application-Specific Integrated Circuit (ASIC), a central processing unit (CPU), a graphics processing unit (GPU), or a general purpose GPU (GPGPU), among other possible implementations. While FIG. 3 shows one accelerator 335, embodiments of the disclosure may include any number (one or more, without bound) of accelerators 335.

Figure 4A:
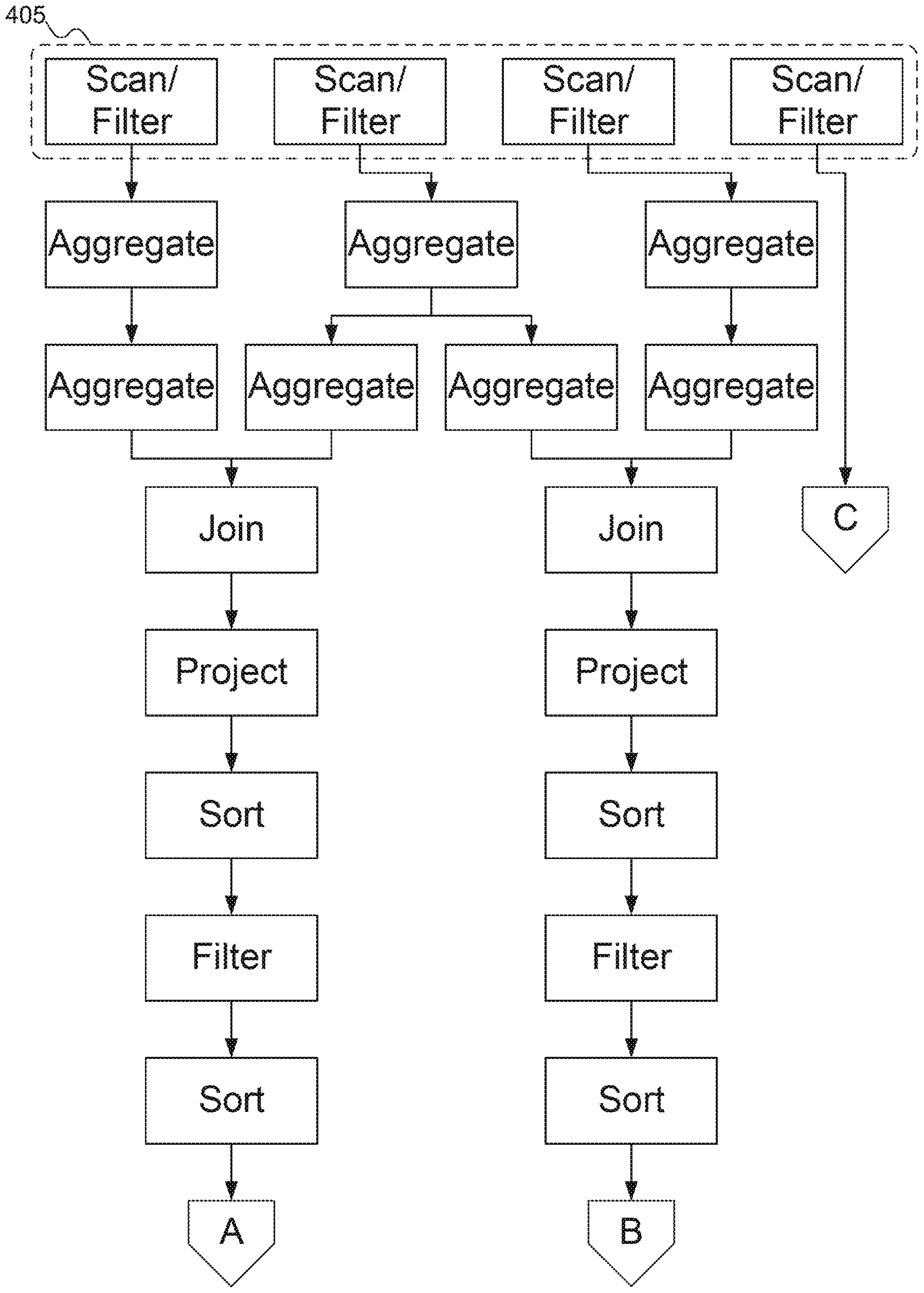
FIGS. 4A-4B show an example sequence of operations performed in processing a database query.
Figure 4B:
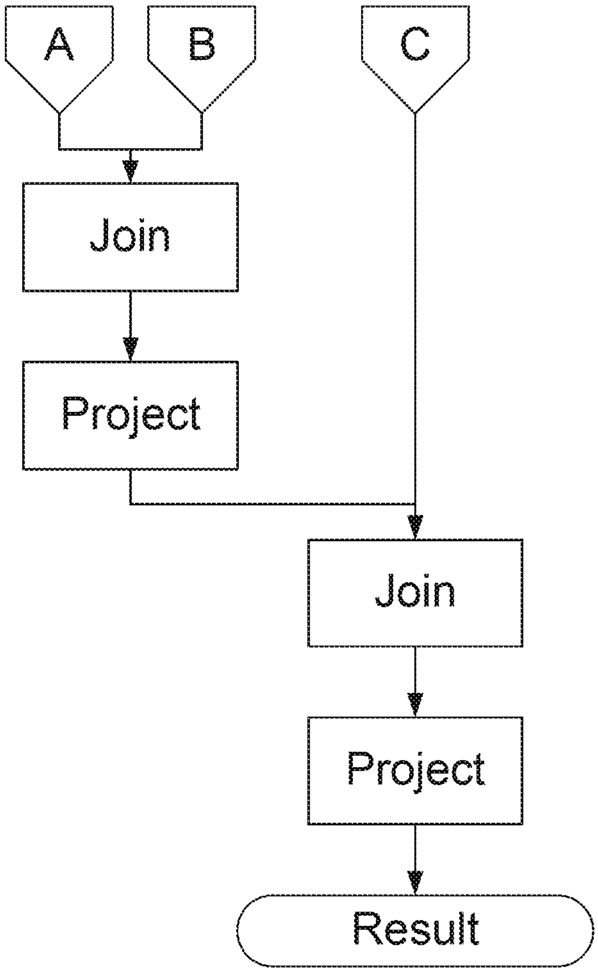

FIGS. 4A-4B show an example sequence of operations performed in processing a database query. In FIGS. 4A-4B, a database query may involve performing several scan/filter operations on the database, after which the data identified by these scan/filter operations may be processed (using aggregate, join, project, sort, and filter operations in various combinations) to produce the desired result.

But while processing the database query may require performing a significant number of operations (as shown), the operations shown in group 405 represent the initial scan/filter operations, which may operate on the database as a whole. The remaining operations shown in FIGS. 4A-4B may involve processing data stored in temporary tables.

If the temporary tables needed to perform the remaining operations in FIGS. 4A-4B fit into memory 115 of FIG. 1, machine 105 of FIG. 1 may handle the remaining operations shown in FIGS. 4A-4B without much delay: only the time used in actually performing the operations (along with time when the operations are delayed: for example, when processor 110 of FIG. 1 is processing other commands and temporarily delays the database query) may be involved. But if the temporary tables are too large to fit into memory 115 of FIG. 1, then the temporary tables may be stored on storage device 120 of FIG. 1. Since processor 110 of FIG. I would need the data in memory 115 of FIG. 1 to perform the intended operations, the temporary tables may be loaded from storage device 120 of FIG. 1 into memory 115 of FIG. 1, then back again to make room for the next table, and so on. This back-and-forth moving of data between memory 115 of FIG. 1 and storage device 120 of FIG. 1 may consume some time: in one test, the operations shown in FIGS. 4A-4B took roughly 90 minutes to complete, most of which was spent reading data from or writing data to storage device 120 of FIG. 1. Thus, pushing such processing to a processor closer to the data may expedite processing of data in the temporary tables.

Figure 5:
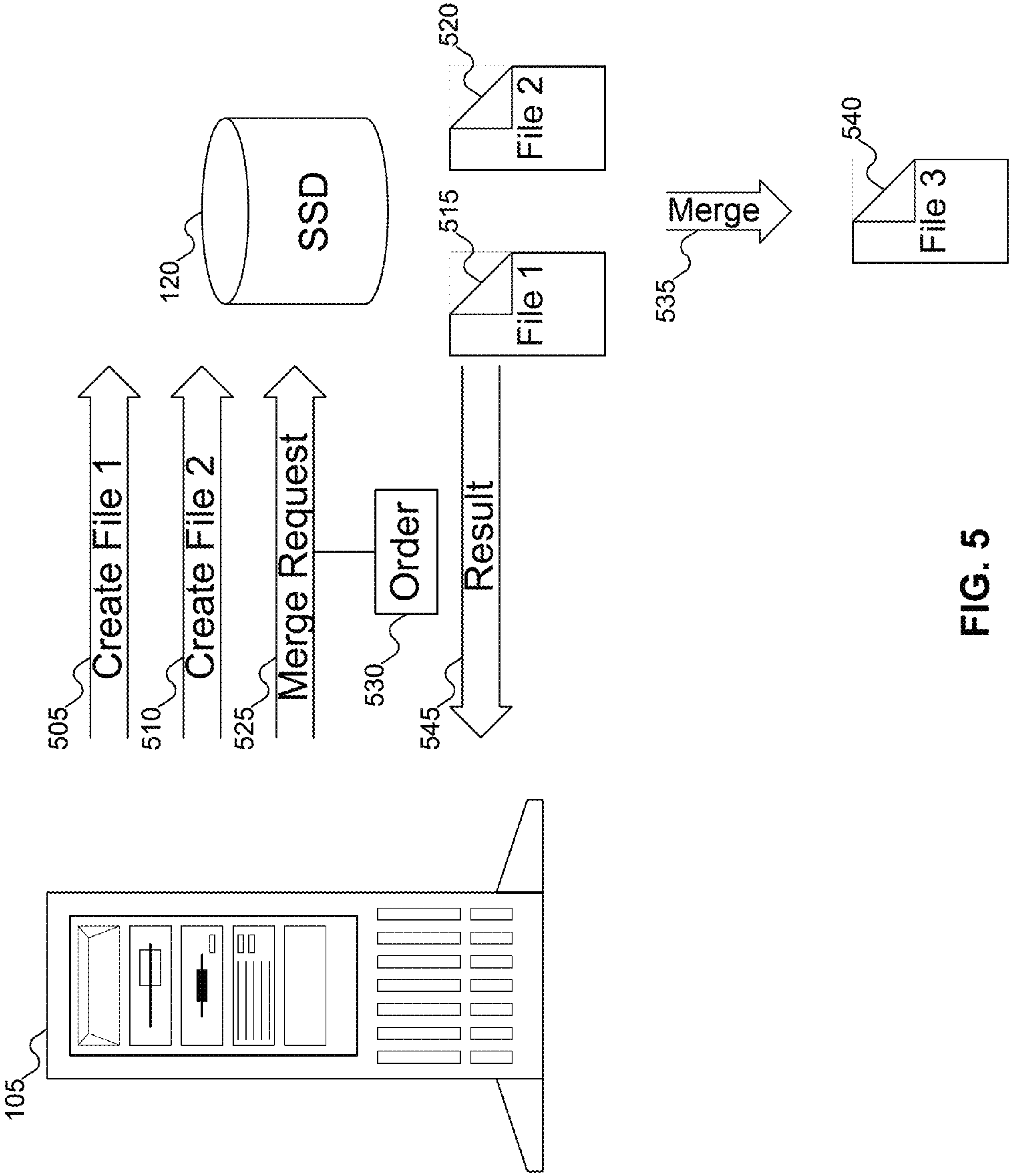
FIG. 5 shows the interplay between the system of FIG. 1 and the SSD of FIG. 1 in performing a merge operation, according to embodiments of the disclosure.

FIG. 5 shows the interplay between system 105 of FIG. 1 and SSD 120 of FIG. 1 in performing a merge operation, according to embodiments of the disclosure. In FIG. 5, machine 105 may send write requests 505 and 510, to write input files 515 and 520 to SSD 120. Machine 105 may also send merge request 525 to SSD 120: merge request 525 may identify to SSD 120 the input files (such as input files 515 and 520) to be merged, and may specify ordering 530 for entries in the input files: for example, to merge the data from smallest to largest entry, or from largest to smallest entry. Upon receiving merge request 525 from machine 105, SSD 120 may perform merge 535 of input files 515 and 520 using ordering 530, to produce output file 540. SSD 120 may then return result 545 to machine 105, informing machine 105 that input files 515 and 520 have been merged to form output file 540.

Since SSD 120 may access data from input files 515 and 520, and may write data to output file 540, SSD 120 may lock these files. By locking input files 515, 520, and 540, SSD 120 may protect against the data in input files 515 and 520 being changed during the merge operation (which could lead to output file 540 potentially not representing a merge of input files 515 and 520, either before or after the data was changed). Similarly, by locking output file 540, SSD 120 may protect against another process attempting to write data to that file (which again could lead to output file 540 potentially not representing a merge of input files 515 and 520). Once merge 535 is complete, SSD 120 may unlock files 515, 520, and 540, so that other processes (such as machine 105) may access the data therein.

In some embodiments of the disclosure, SSD 120 may be aware that input files 515 and 520 are temporary files generated by machine 105: for example, during processing of a database query. Since temporary tables generated during the processing of a database query may take a special format, SSD 120 may determine that input files 515 and 520 are temporary tables because, for example, they include such special format. In such embodiments of the disclosure, if SSD 120 is aware that input files 515 and 520 are not needed after merge 535 is complete, SSD 120 may delete input files 515 and 520. In other embodiments of the disclosure, SSD 120 may assume that input files 515 and 520 are just like any other files (as indeed they may be), and may leave it to machine 105 to send a request to delete input files 515 and 520 when they are no longer needed.

While FIG. 5 shows two write requests 505 and 510 (and two input files 515 and 520), embodiments of the disclosure may extend to merge operations that may be performed on more than two input files. Embodiments of the disclosure may support merging any number, two or more (without bound) of input files, as discussed with reference to FIG. 13 below.

However, implementation of accelerator 335 of FIG. 3 may involve specifying in advance an upper bound on the number of files that may be merged in a single merge 535. If machine 105 has more files to merge than this upper bound permits, machine 105 may still accomplish the desired merge operation, but it may involve multiple steps.

Consider, for example, an implementation that supports up to four input files in a single merge operation. If machine 105 includes 16 input files, input files 1-4 may be merged using one merge operation, then input files 5-8 may be merged, then input files 9-12, and finally input files 13-16. The four output files of these for merge operations may then be merged themselves using one additional merge, resulting in the entries of all 16 original input files in the final output file.

Figure 6A:
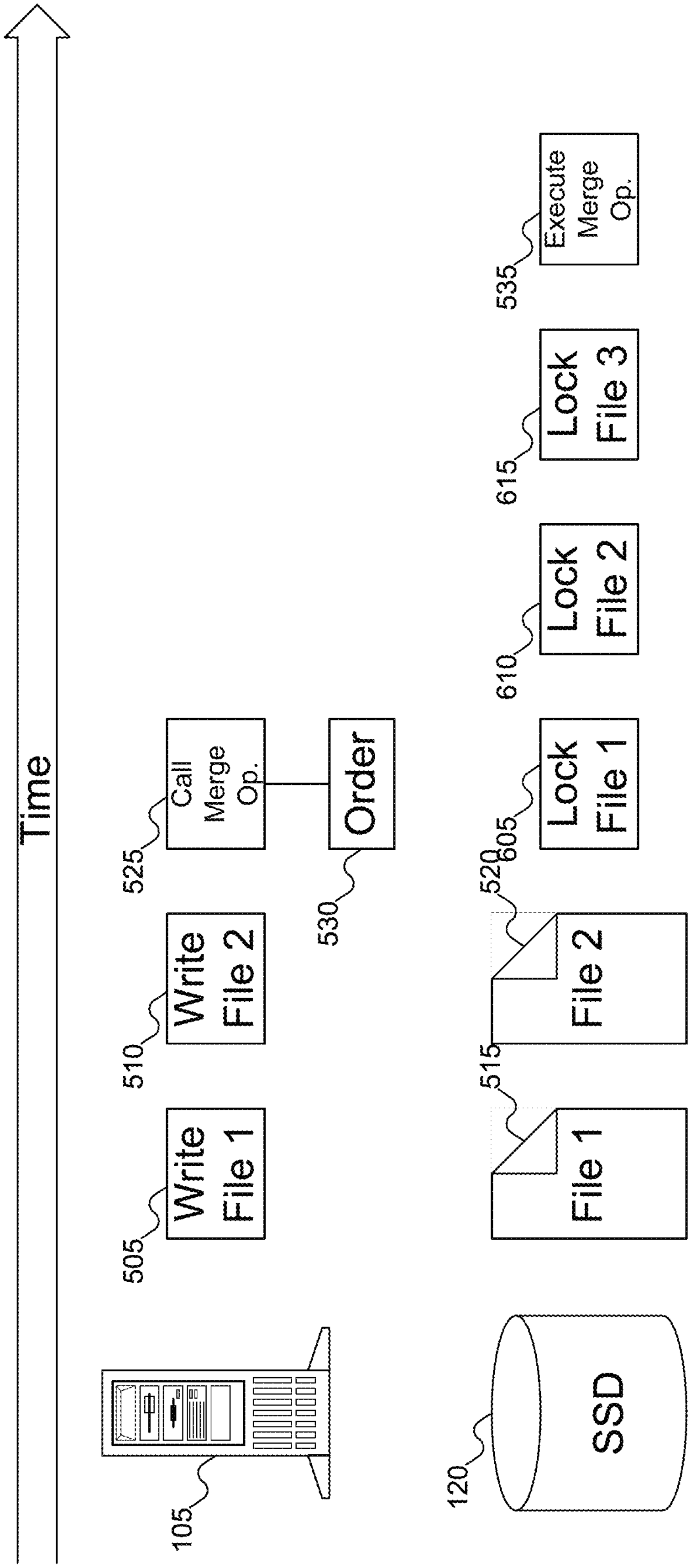
FIGS. 6A-6B show operations performed by the machine of FIG. 1 and the SSD of FIG. 1 in performing a merge operation, according to embodiments of the disclosure.
Figure 6B:
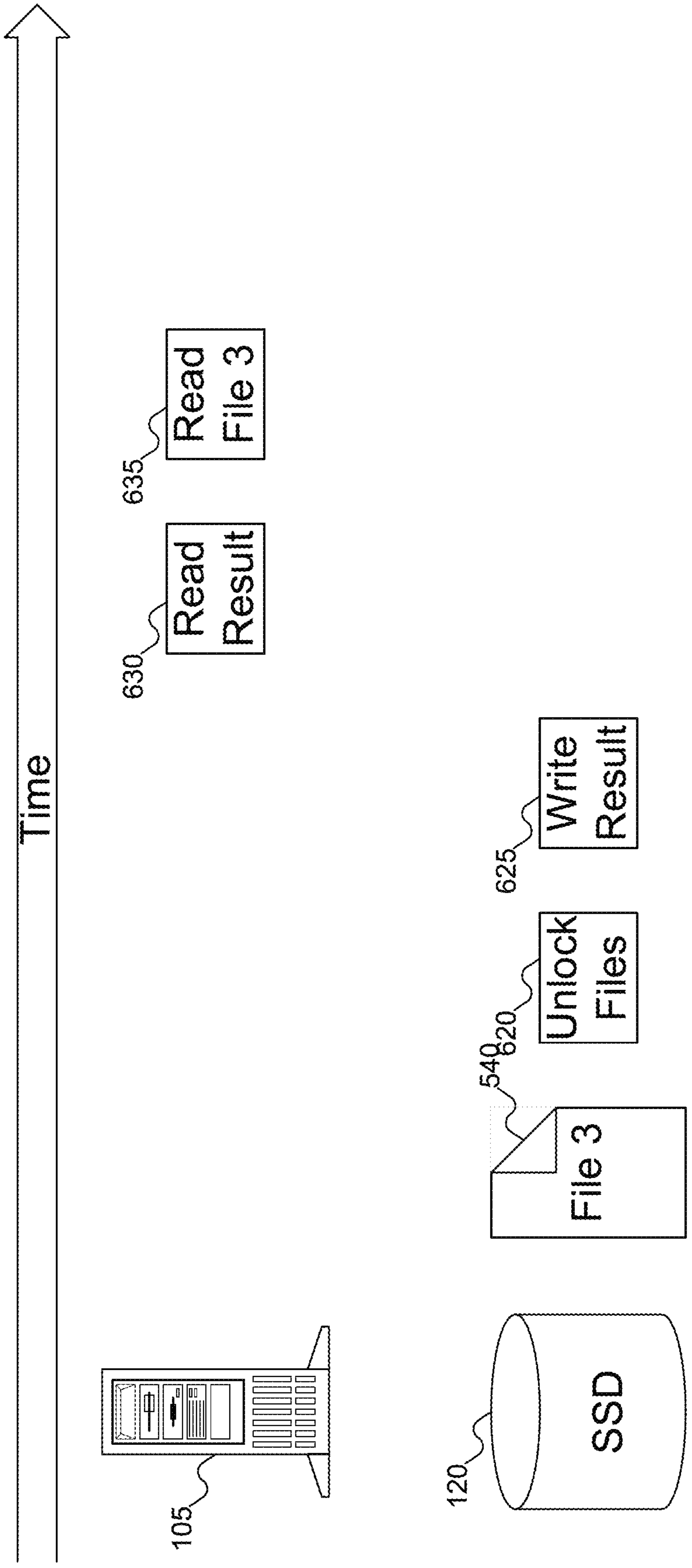

FIGS. 6A-6B show operations performed by machine 105 of FIG. 1 and SSD 120 of FIG. 1 in performing merge operation 535, according to embodiments of the disclosure. In FIGS. 6A-6B, time is shown moving from left to right: events closer to the left side of the figure may occur earlier in time than events further from the left side of the figure. Events occurring on machine 105 or SSD 120 are shown along the horizontal line centered on machine 105 and SSD 120.

At some point, machine 105 may issue write request 505, resulting in input file 515 being written to SSD 120. Machine 105 may issue write request 510, resulting in input file 1605 being written to SSD 120. Machine 105 may issue merge request 525 (a call to the merge function in accelerator 335 of FIG. 3) with ordering 530 specified, and wait for SSD 120 to complete processing of merge request 525. (Of course, machine 105 might not block and wait for SSD 120 to complete merge request 525: machine 105 may perform other operations during this time. Only processing that may depend on SSD 120 completing merge request 525 may be blocked.)

To carry out merge request 525, SSD 120 may lock input file 515 (lock operation 605), file input 520 (lock operation 610), and output file 540 (lock operation 615). SSD 120 may then perform merge 535, as described above and below.

Eventually, output file 540 may be produced (FIG. 6B). Once output file 540 is produced, SSD 120 may unlock input files 515 and 520 and output file 540 (unlock operation 620) and may write a result to a location where machine 105 may read it (write operation 625). SSD 120 may also (or alternatively) send a message to machine 105, informing machine 105 that merge 535 is complete. Machine 105 may then read the result (read operation 630), and may read output file 540 from SSD 120 (read operation 635) to examine the results of merge request 540.

Note that while FIGS. 6A-6B focus on merge 535, FIGS. 6A-6B are fairly generic. For example, FIGS. 6A-6B do not include the specifics of how a merge is performed. Thus, FIGS. 6A-6B may be considered exemplary, and with appropriate modification (perhaps to the number of files written by machine 105, the specific function requested, any parameters applicable to the function, and the number of files created by SSD 120) may be understood as teaching the operations of other functions offered by accelerator 335 of FIG. 3. Thus, variations of FIGS. 6A-6B for other functions offered by accelerator 335 of FIG. 3 are not presented herein.

Figure 7A:
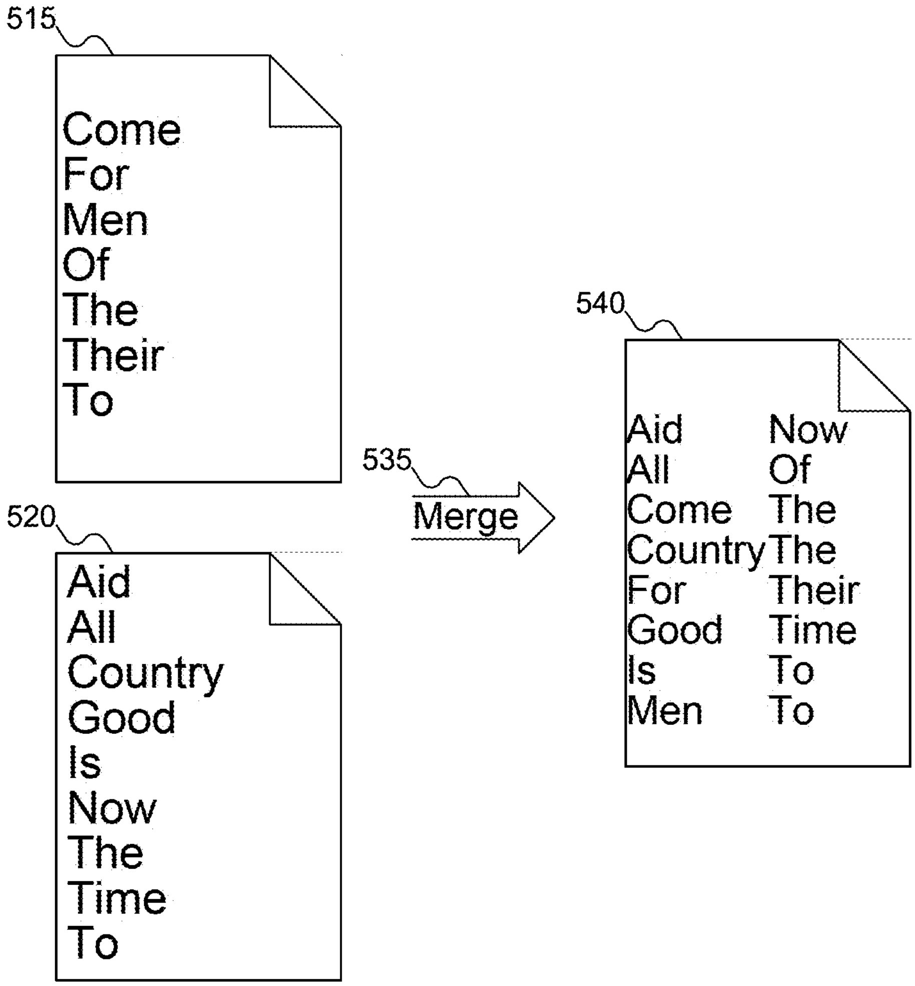
FIGS. 7A-7B show example merge operations performed on two files, according to embodiments of the disclosure.
Figure 7B:
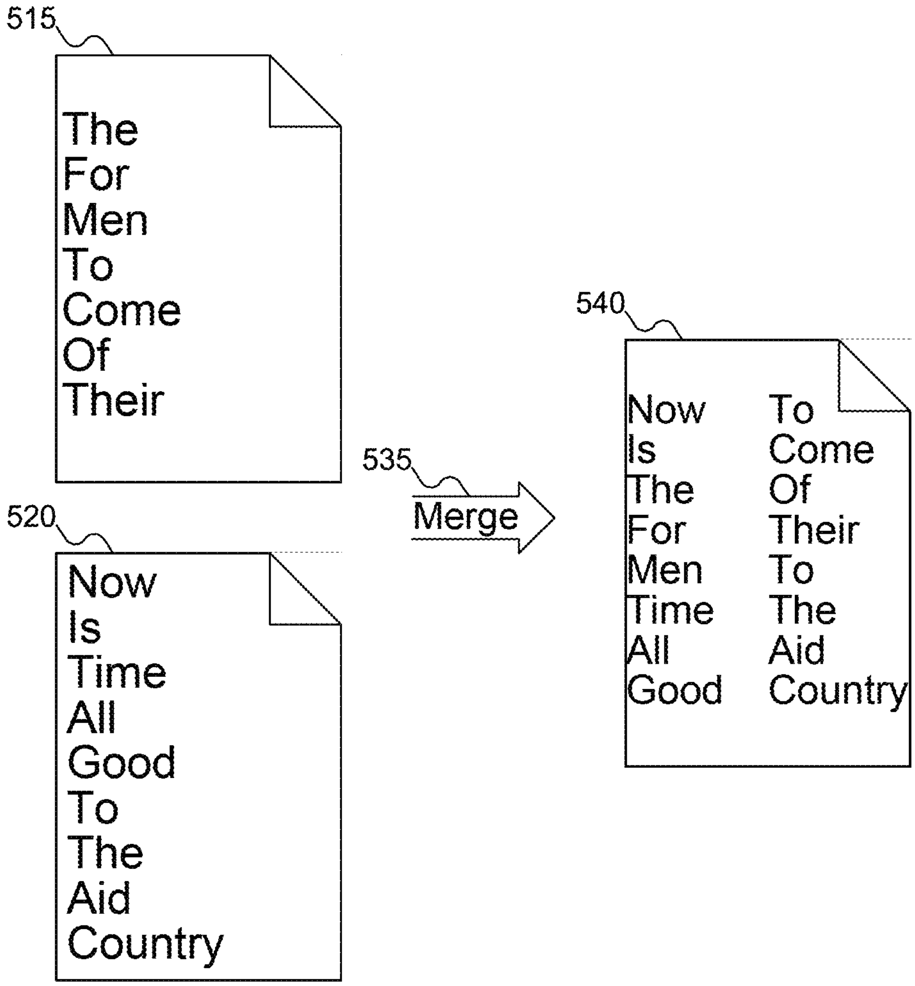

FIGS. 7A-7B show example merge operations performed on two input files, according to embodiments of the disclosure. In FIG. 7A, input files 515 and 520 are shown, including lists of words in sorted order. Merge operation 535 of FIG. 5 may consider entries (which may also be termed values) in each input file sequentially. Entries from the input file with the entry that comes first based on ordering 530 of FIG. 5 may be copied from that input file to the output file until an entry is reached that follows the entry in the other input file based on ordering 530 of FIG. 5, after which copying may begin from the other input file. This process may continue until all entries in one input file have been processed, after which any remaining entries in the other input file may be copied to the output file.

Thus, for example, the first entry in file 515 is "Come", while the first entry in file 520 is "Aid". Assuming that the smallest to largest sort order was specified, "Aid" is ordered before "Come", so "Aid" is written to file 540 first. The next entry in file 520, "All", also is ordered before "Come", so "All" is written to file 540 next. The next entry in file 520, "Country", is ordered after "Come", so "Come" is written to file 540 next, and so on. After all entries in both input files 515 and 520 have been processed, file 540 is complete, as shown.

In the above discussion, it has been assumed that input files 515 and 520 are themselves sorted (and both use ordering 530 of FIG. 5 specified in merge request 525 of FIG. 5). If this assumption is correct, then file 540 may be sorted after merge 535 completes. But it is possible for merge 535 to process input files 515 and 520, and produce output file 540, even if input files 515 and 520 are not sorted. The only caveat is that output file 540 will not be sorted as a result. FIG. 7B illustrates this case.

In FIG. 7B, input files 515 and 520 contain the same entries as in FIG. 7A, but are no longer sorted. (While FIG. 7B keeps the same entries in each of input files 515 and 520 and merely changes their order, embodiments of the disclosure may have any entries in any order, in input files 515 and 520.) Comparing the first entries in each list, "Now" (in input file 520) is ordered before "The" (in input file 515), so "Now" and "Is" may be copied from input file 520 to output file 540. "The" (in input file 515) is ordered before "Time", so "The", "For" and "Men" may be copied from input file 515 to output file 540, and so on. As may be seen, input files 515 and 520 are successfully merged, even though output file 540 is not sorted (because input files 515 and 520 were not sorted).

Figure 8:
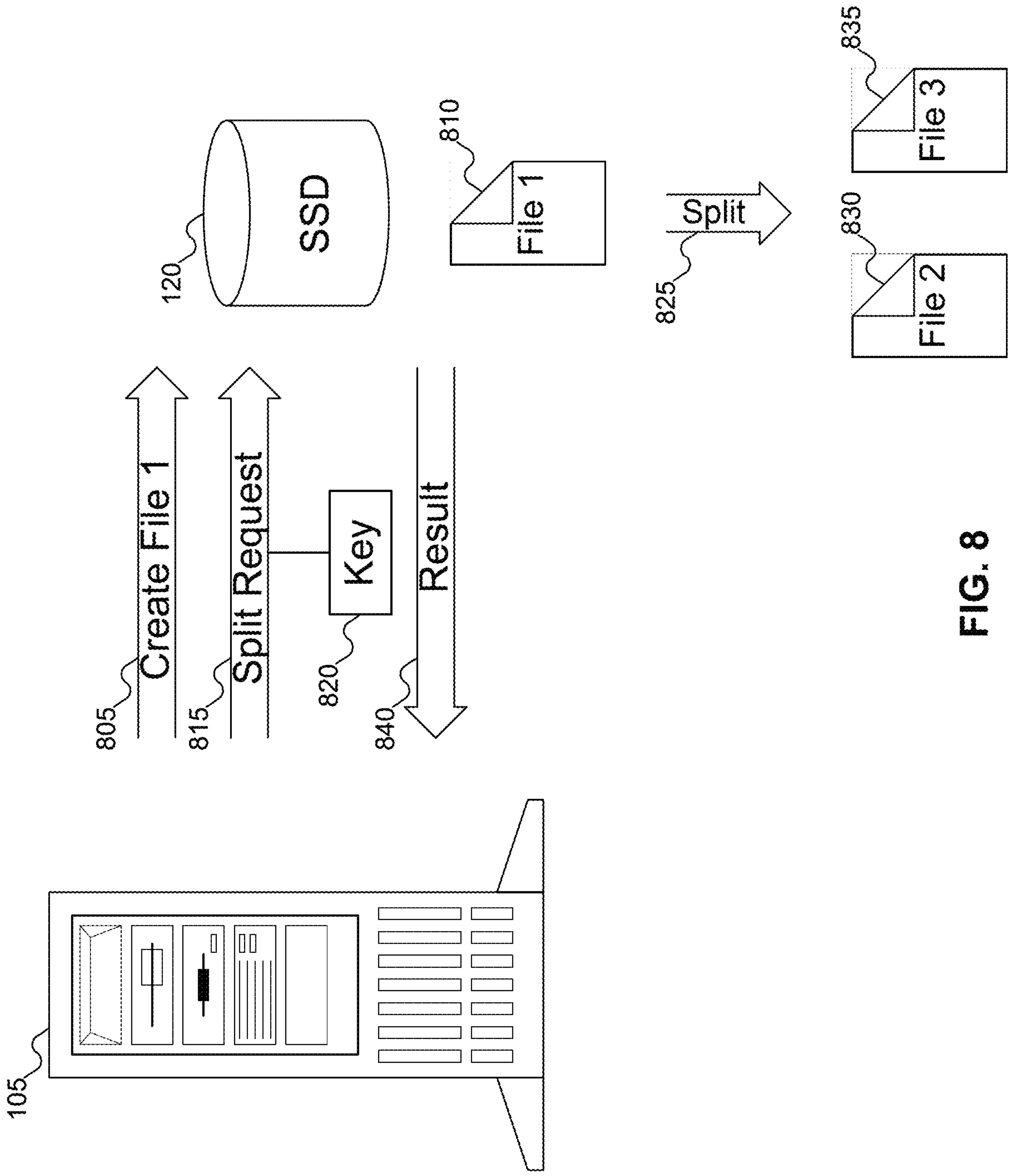
FIG. 8 shows the interplay between the system of FIG. 1 and the SSD of FIG. 1 in performing a split operation, according to embodiments of the disclosure.

FIG. 8 shows the interplay between system 105 of FIG. 1 and SSD 120 of FIG. 1 in performing a split operation, according to embodiments of the disclosure. In FIG. 8, machine 105 may send write request 805, to write input file 810 to SSD 120. Machine 105 may also send split request 815 to SSD 120: split request 815 may identify to SSD 120 the file (such as file 810) to be split. Split request 815 may also include key 820, identifying the point at which entries are to be divided between two output files. Thus, one output file may include all entries that are no larger than key 820, and another output file may include all entries that are larger than key 820. Upon receiving split request 815 from machine 105, SSD 120 may perform split 825 of file 810 using the key 820, to produce output files 830 and 835. SSD 120 may then return result 840 to machine 105, informing machine 105 that file 810 has been split to form output files 830 and 835.

Since SSD 120 may access data from input file 810, and may write data to output files 830 and 835, SSD 120 may lock these files. By locking files 810, 830, and 835, SSD 120 may protect against the data in input file 810 being changed during the split operation (which could lead to output files 830 and 835 potentially not representing a split of input file 810, either before or after the data was changed). Similarly, by locking output files 830 and 835, SSD 120 may protect against another process attempting to write data to that file (which again could lead to output files 830 and 835 potentially not representing a split of input file 810). Once split 825 is complete, SSD 120 may unlock files 810, 830, and 835, so that other processes (such as machine 105) may access the data therein.

In some embodiments of the disclosure, SSD 120 may be aware that input file 810 is a temporary file generated by machine 105: for example, during processing of a database query. Since temporary tables generated during the processing of a database query may take a special format, SSD 120 may determine that input file 810 is a temporary table because, for example, it includes such special format. In such embodiments of the disclosure, if SSD 120 is aware that input file 810 is not needed after split 825 is complete, SSD 120 may delete input file 810. In other embodiments of the disclosure, SSD 120 may assume that input file 810 is just like any other file (as indeed it may be), and may leave it to machine 105 to send a request to delete the file when it is no longer needed.

While FIG. 8 shows two input file 810 being divided into two output files 830 and 835 using key 820, embodiments of the disclosure may extend to split operations that may be performed using two or more keys. Embodiments of the disclosure may support splitting input file 810 into any number, two or more (without bound) of output files. Such an operation is discussed with reference to FIGS. 10-11 below.

Figure 9:
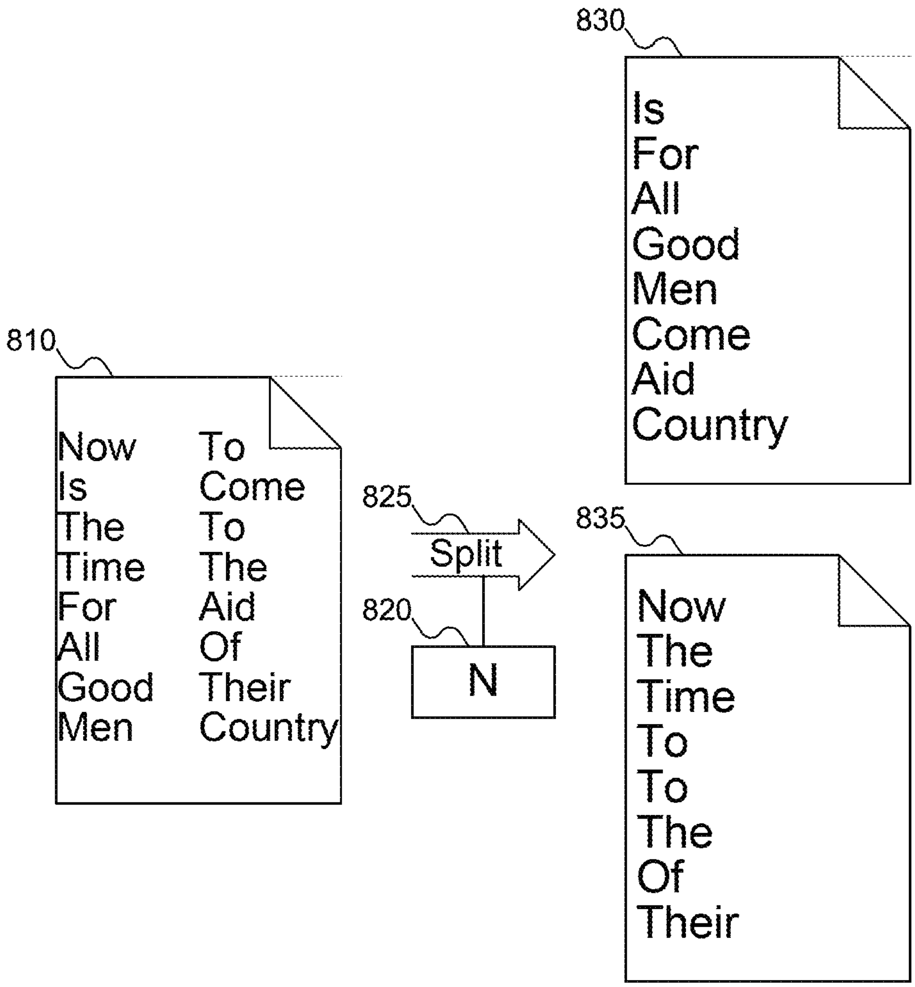
FIG. 9 shows an example split operation performed on a file, according to embodiments of the disclosure.

FIG. 9 shows an example split operation performed on input file 810 of FIG. 8, according to embodiments of the disclosure. In FIG. 9, input file 810 is shown as including various entries. Note that input file 810 is not sorted: split 825 may be performed without reference to whether or not input file 810 is sorted. If input file 810 is sorted, then output files 830 and 835 may be sorted; if not, then not.

Key 820 indicates that all entries that are no larger than the value "N" may be written to output file 830, and entries that are larger than the value "N" may be written to output file 835. Output files 830 and 835 show the division of the entries in input file 810. While in FIG. 9 output files 830 and 835 contain equal number of entries from input file 810, embodiments of the disclosure may produce output files with differing numbers of entries.

Figure 10:
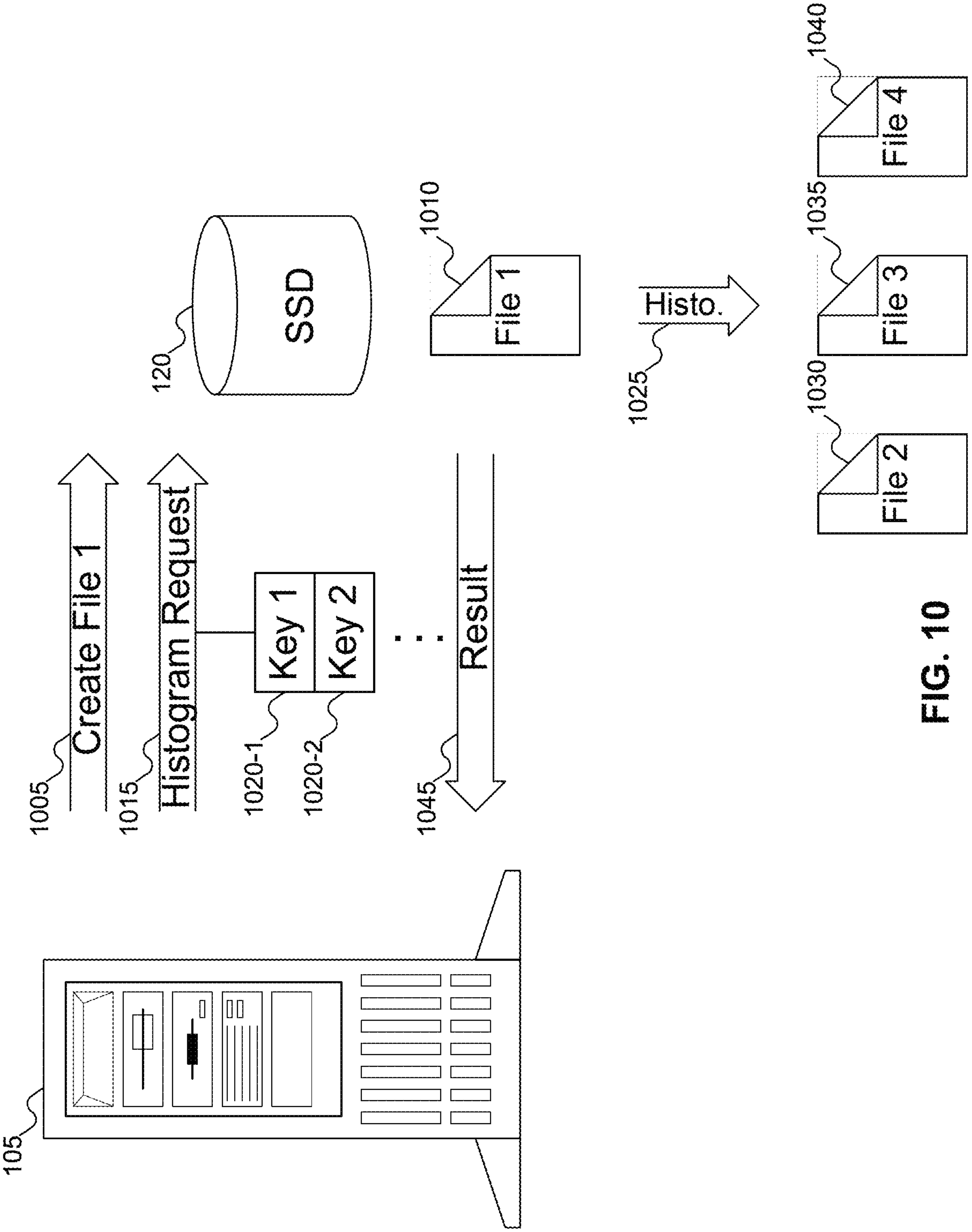
FIG. 10 shows the interplay between the system of FIG. 1 and the SSD of FIG. 1 in performing a histogram operation, according to embodiments of the disclosure.

FIG. 10 shows the interplay between system 105 of FIG. 1 and SSD 120 of FIG. 1 in performing a histogram operation, according to embodiments of the disclosure. In FIG. 10, machine 105 may send write request 1005, to write input file 1010 to SSD 120. Machine 105 may also send histogram request 1015 to SSD 120: histogram request 1015 may identify to SSD 120 the file (such as file 1010) to be split. Histogram request 1015 may also include keys 1020-1 and 1020-2, identifying the points at which entries are to be divided among three output files. Thus, one output file may include all entries that are no larger than key 1020-1, another output file may include all entries that are larger than key 1020-1 but no larger than key 1020-2, and a third output file may include all entries that are larger than key 1020-2. (Since there are two keys, the keys may be organized so that they are in a sorted order (if key 1020-1 is larger than key 1020-2, the above-described division of entries in input file 1010 might not make sense). Upon receiving histogram request 1015 from machine 105, SSD 120 may perform histogram 1025 of file 1010 using the keys 1020-1 and 1020-2, to produce output files 1030, 1035, and 1040. SSD 120 may then return result 1045 to machine 105, informing machine 105 that file 1010 has been split to form output files 1030, 1035, and 1040.

Since SSD 120 may access data from input file 1010, and may write data to output files 1030, 1035, and 1040, SSD 120 may lock these files. By locking files 1010, 1030, 1035, and 1040, SSD 120 may protect against the data in input file 1010 being changed during the split operation (which could lead to output files 1030, 1035, and 1040 potentially not representing a histogram of input file 1010, either before or after the data was changed). Similarly, by locking output files 1030, 1035, and 1040, SSD 120 may protect against another process attempting to write data to that file (which again could lead to output files 1030, 1035, and 1040 potentially not representing a histogram of input file 1010). Once histogram 1025 is complete, SSD 120 may unlock files 1010, 1030, 1035, and 1040, so that other processes (such as machine 105) may access the data therein.

In some embodiments of the disclosure, SSD 120 may be aware that input file 1010 is a temporary file generated by machine 105: for example, during processing of a database query. Since temporary tables generated during the processing of a database query may take a special format, SSD 120 may determine that input file 1010 is a temporary table because, for example, it includes such special format. In such embodiments of the disclosure, if SSD 120 is aware that input file 1010 is not needed after split 1025 is complete, SSD 120 may delete input file 810. In other embodiments of the disclosure, SSD 120 may assume that input file 810 is just like any other file (as indeed it may be), and may leave it to machine 105 to send a request to delete the file when it is no longer needed.

While FIG. 10 shows two keys 1020-1 and 1020-2 (and three output files 1030, 1035, and 1040), embodiments of the disclosure may extend to histogram operations that may be performed using any number of keys. Embodiments of the disclosure may support splitting input file 1010 into any number, two or more (without bound) of output files, as discussed with reference to FIGS. 15A-15B below. The only practical limit on the number of keys that may be used (and the number of output files that may be produced) may be the available memory in SSD 120 and the buffer size used in SSD 120. For example, if SSD 120 includes about 4 gigabytes (GB) of memory and buffers are about 64 kilobytes (KB) in size, as a practical matter histogram 1025 might be limited to using no more than eight keys total (and therefore producing nine output files). In addition, while FIG. 10 shows keys 1020-1 and 1020-2 being received as separate elements, embodiments of the disclosure may include receiving keys 1020-1 and 1020-2 in other ways: for example, as an array of keys.

Figure 11:
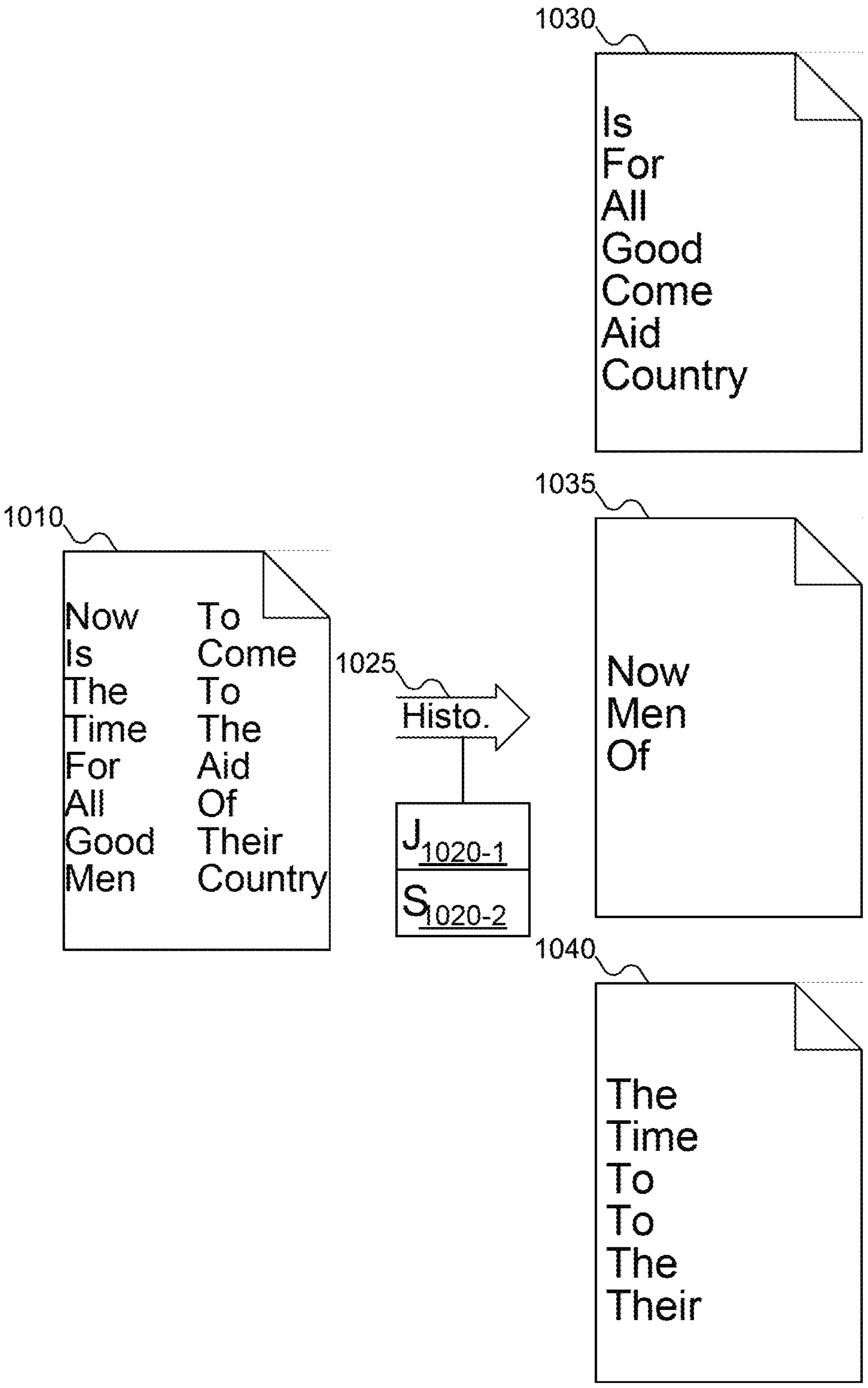
FIG. 11 shows an example histogram operation performed on a file, according to embodiments of the disclosure.

FIG. 11 shows an example histogram operation performed on input file 1010 of FIG. 10, according to embodiments of the disclosure. In FIG. 11, input file 1010 is shown as including various entries. Note that input file 1010 is not sorted: histogram 1025 may be performed without reference to whether or not input file 1010 is sorted. If input file 1010 is sorted, then output files 1030, 1035, and 1040 may be sorted; if not, then not.

Key 1020-1 indicates that all entries that are no larger than the value "J" may be written to output file 1030, entries that are larger than the value "J" and no larger than the value "S" may be written to output file 1035, and entries that are larger than the value "S" may be written to output file 1040. Output files 1030, 1035, 1040 show the division of the entries in input file 1010. Note that in FIG. 11, output files 1030, 1035, 1040 may or may not contain equal number of entries from input file 1010.

Figure 12:
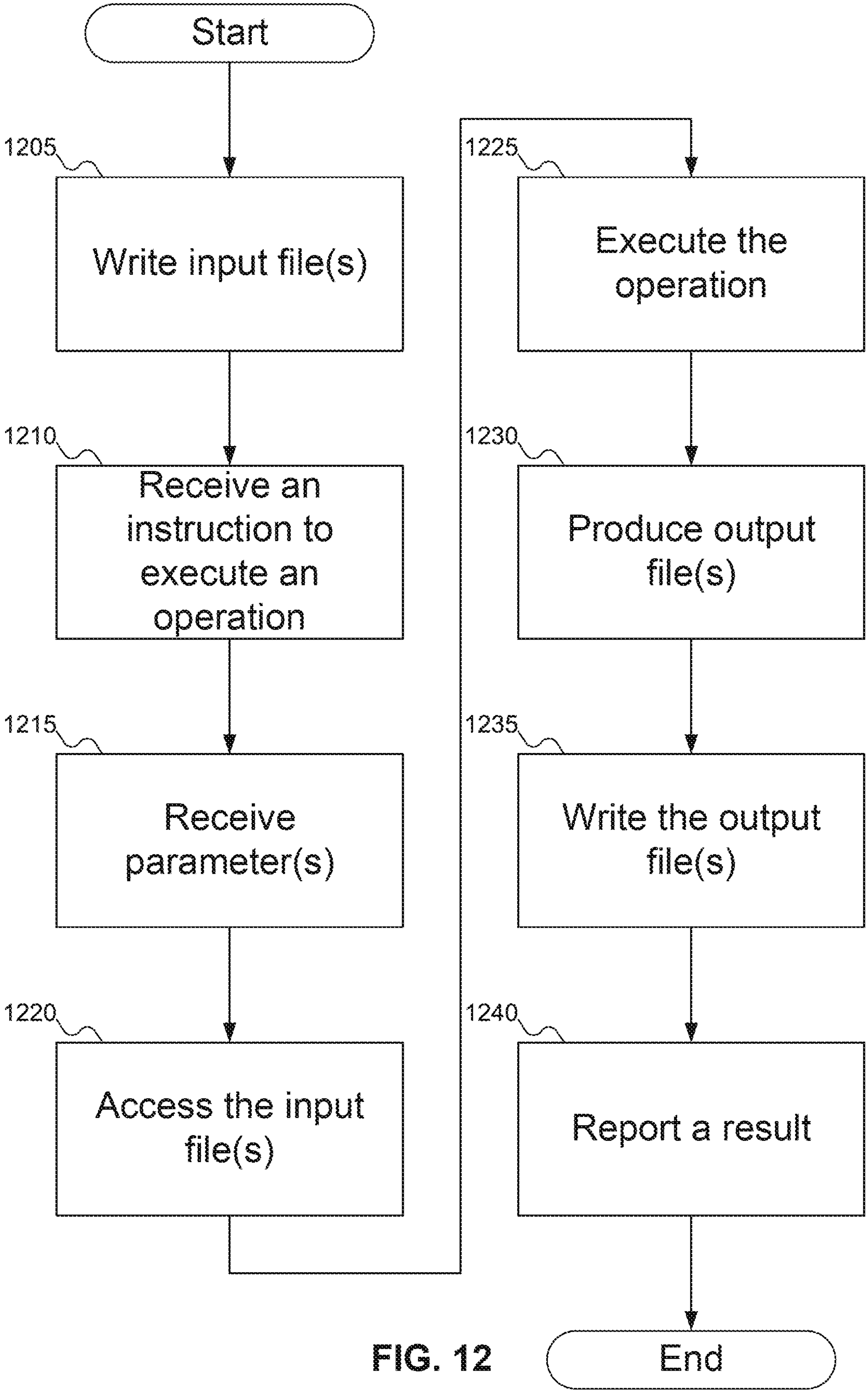
FIG. 12 shows a flowchart of an example procedure for the SSD of FIG. 1 to perform acceleration functions to process files, according to embodiments of the disclosure.

FIG. 12 shows a flowchart of an example procedure for SSD 120 of FIG. 1 to perform acceleration functions to process files, according to embodiments of the disclosure. In FIG. 12, at block 1205, SSD 120 of FIG. 1 may receive a request from machine 105 of FIG. 1 to write input file(s), such as input files 515, 520, 810, and/or 1010 of FIGS. 5, 8, and 10 to SSD 120 of FIG. 1. At block 1210, SSD 120 of FIG. 1 may receive a request to execute an operation supported by accelerator 335 of FIG. 1. This request may include merge request 525 of FIG. 5, split request 815 of FIG. 8, or histogram request 1015 of FIG. 10. At block 1215, SSD 120 of FIG. 1 may receive parameters for the request. These parameters may include, for example, the identifiers of files 515, 520, 810, and/or 1010 of FIGS. 5, 8, and 10, ordering 530 of FIG. 5, and/or keys 820, 1020-1, and/or 1020-2 of FIGS. 8 and 10.

At block 1220, SSD 120 of FIG. 1 may access the input files from storage. This operation may involve locking the input files, to prevent the data in the input files from being changed during execution of the operation. This operation may also include locking output files 540, 830, 835, 1030, 1035, and/or 1040 of FIGS. 5, 8, and 10, again to prevent the output files from being modified during execution of the operation. At block 1225, accelerator 335 of FIG. 3 may execute the specified operation on the input file(s) using the parameters, to produce the output file(s) as shown at block 1230.

At block 1235, SSD 120 of FIG. 1 may write the output file(s) to storage. Finally, at block 1240, SSD 120 of FIG. 1 may report to machine 105 of FIG. 1 that the requested operation has completed.

Figure 13:
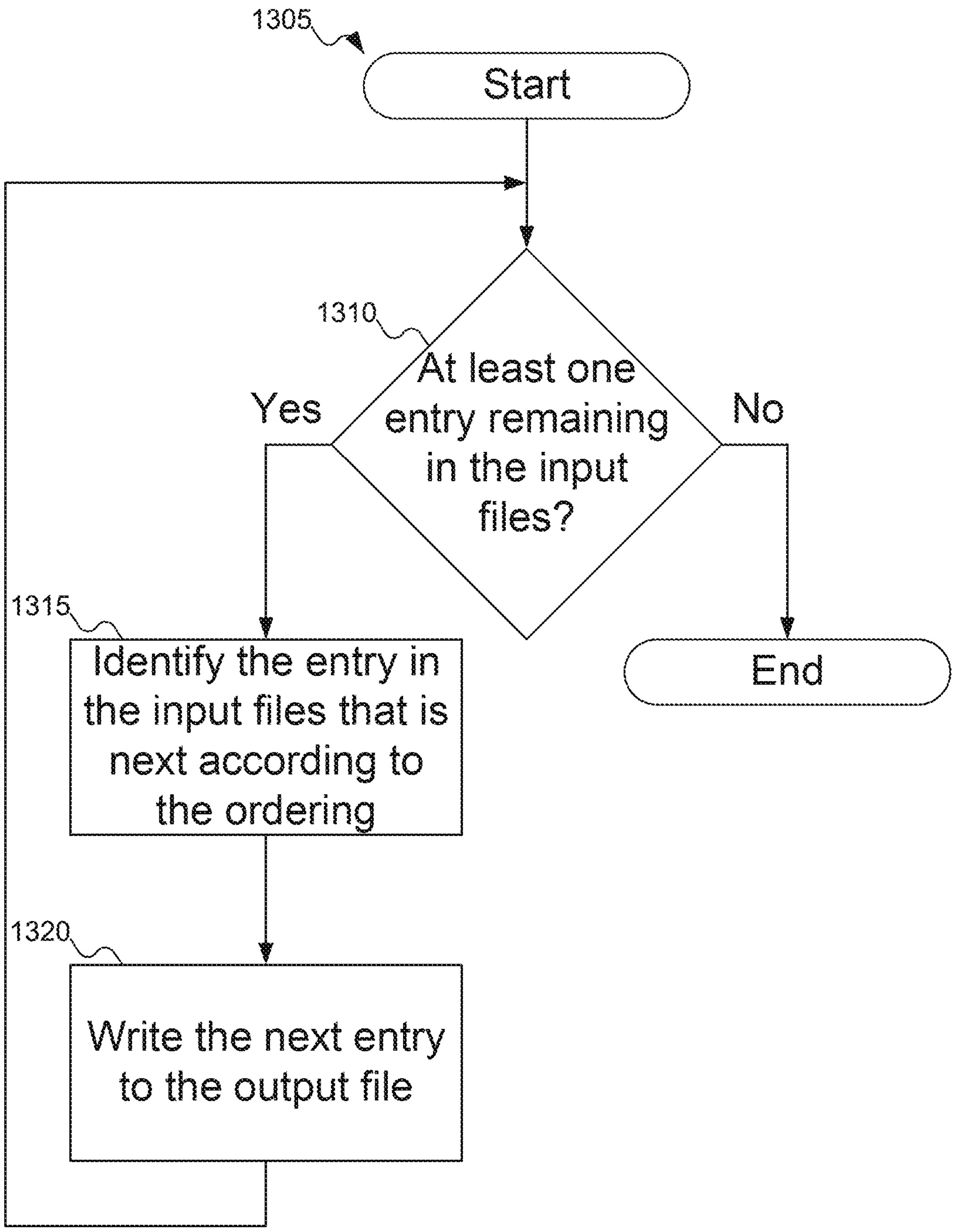
FIG. 13 shows a flowchart of an example procedure for the SSD of FIG. 1 to perform a merge operation on files, according to embodiments of the disclosure.

FIG. 13 shows a flowchart of an example procedure for SSD 120 of FIG. 1 to perform merge 535 of FIG. 5 on files, according to embodiments of the disclosure. The overall flow to combine two (or more) input files is shown as sequence 1305. At block 1310, accelerator 335 of FIG. 3 may verify that at least one input file still includes entries. If not, then processing is complete. Otherwise, at block 1315, accelerator 335 of FIG. 3 may identify the next entry in each of the input files (ignoring any input files that have no remaining entries to process), and compare them to determine which entry is next according to ordering 530 of FIG. 5. At block 1320, accelerator 335 of FIG. 3 may write the entry that is next according to ordering 530 of FIG. 5 to output file 540 of FIG. 5. Processing may then return to block 1310 to consider the next entry to be written to output file 540 of FIG. 5.

FIG. 13 shows the more general form of merge 535 of FIG. 5 where more than two input files may be merged. Where only two input files are to be merged, the example flowchart may be simplified slightly: at any point in time there are only two possible entries to compare, so the one that is next according to ordering 530 of FIG. 5 may be written to output file 540 of FIG. 5 without having to consider the comparison of multiple entries from more than two input files.

Figure 14:
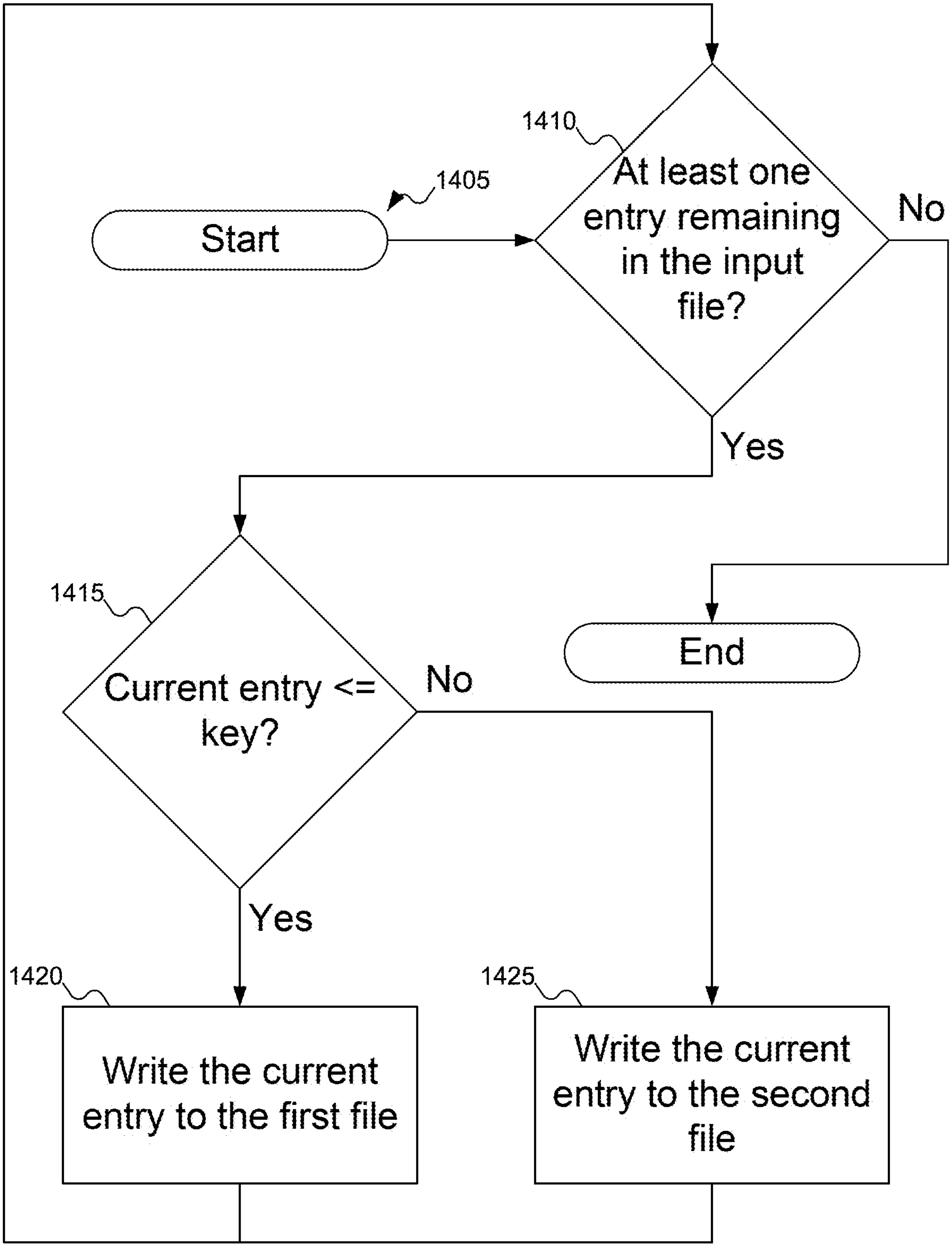
FIG. 14 shows a flowchart of an example procedure for the SSD of FIG. 1 to perform a split operation on files, according to embodiments of the disclosure.

FIG. 14 shows a flowchart of an example procedure for SSD 120 of FIG. 1 to perform split 825 of FIG. 8 on files, according to embodiments of the disclosure. The overall flow to split an input file into two output files is shown as sequence 1405. In FIG. 14, at block 1410, accelerator 335 of FIG. 3 may verify that at least one input file still includes entries. If not, then processing is complete. Otherwise, at block 1415, accelerator 335 of FIG. 3 may compare the next entry in input file 810 of FIG. 8 with key 820 of FIG. 8. If the next entry is no larger than key 820 of FIG. 8, then at block 1420 the next entry may be written to output file 830 of FIG. 8; otherwise, at block 1425 the next entry may be written to output file 835 of FIG. 8.

Figure 15A:
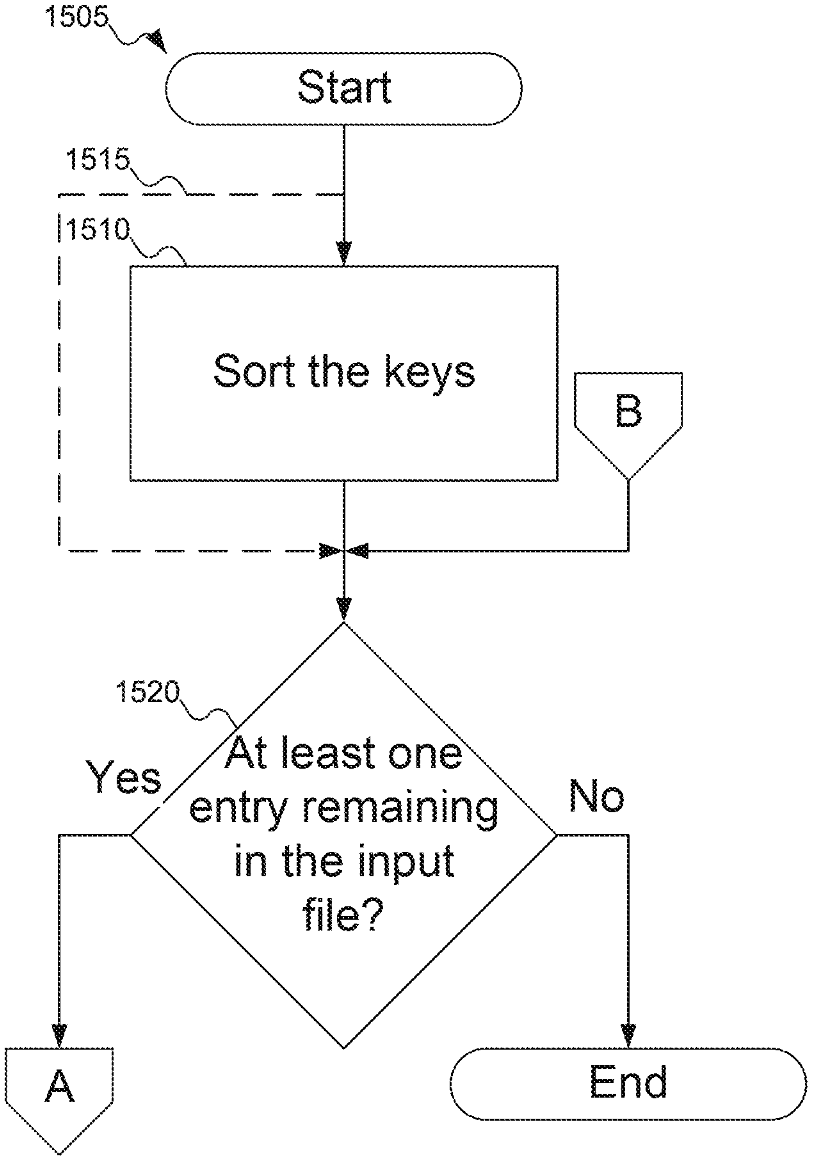
FIGS. 15A-15B show a flowchart of an example procedure for the SSD of FIG. 1 to perform a histogram operation on files, according to embodiments of the disclosure.
Figure 15B:
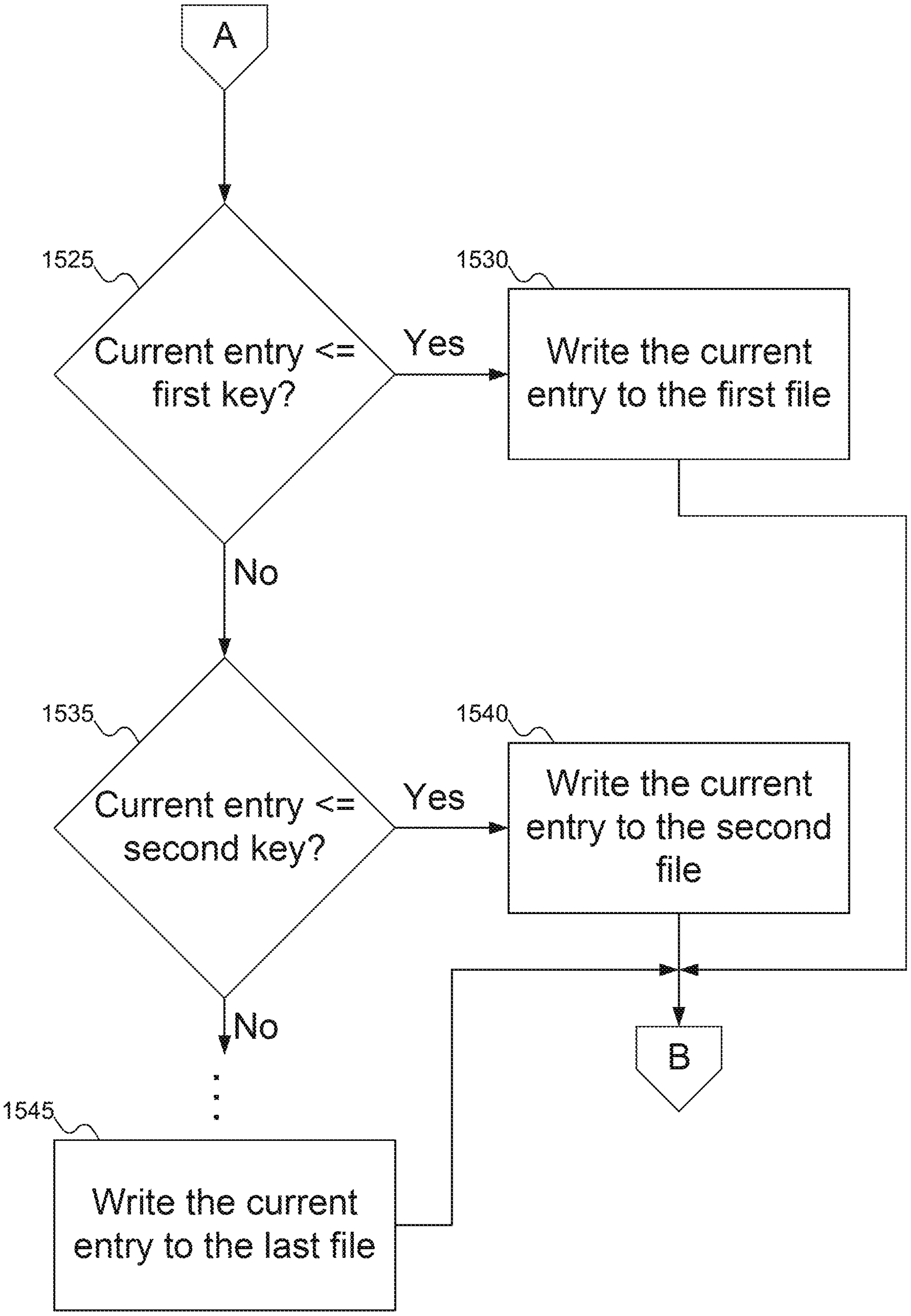

FIGS. 15A-15B show a flowchart of an example procedure for SSD 120 of FIG. 1 to perform histogram 1025 of FIG. 10 on files, according to embodiments of the disclosure. The overall flow to histogram an input file into three or more output files is shown as sequence 1505. In FIG. 15A, at block 1510, keys 1020-1 and 1020-2 of FIG. 10 may be sorted. Block 1510 may be omitted, as shown by dashed line 1515. At block 1520, accelerator 335 of FIG. 3 may verify that at least one input file still includes entries. If not, then processing is complete. Otherwise, at block 1525 (FIG. 15B), accelerator 335 of FIG. 3 may compare the next entry in input file 1010 of FIG. 10 with key 1020-1 of FIG. 10. If the next entry is no larger than key 1020-1 of FIG. 10, then at block 1530 the next entry may be written to output file 1030 of FIG. 10. Otherwise, at block 1535 if the next entry is no larger than key 1020-2 of FIG. 10, then at block 1540 the next entry may be written to output file 1035 of FIG. 10. This process of comparing the next entry with different keys provided with histogram request 1015 of FIG. 10 may be repeated until either the next entry is no larger than some key, or all keys have been considered. If the next entry is larger than every key provided with histogram request 1015 of FIG. 10, then the next entry may be written to file 1040 of FIG. 10. Processing may then return to block 1520 of FIG. 15A to consider the next entry in input file 1010 of FIG. 10.

Note again the value of including block 1510 to sort keys 1020-1 and 1020-2 of FIG. 10 (in increasing order). If the keys are not sorted, then it may happen that one or more output files may end up blank, with all entries that might have belonged in that output file assigned to another output file. For example, consider an input file that includes the numbers 1-10. If the keys are provided as, say, 3 and 7, then numbers 1-3 may be assigned to one file, numbers 4-7 may be assigned to a second file, and numbers 8-10 may be assigned to a third file. But if the keys are provided as, say, 7 and 3, then numbers 1-7 may be assigned to the first file, numbers 8-10 may be assigned to the third file, and the second file may be left blank. Thus, sorting keys 1020-1 and 1020-2 of FIG. 10 in a manner consistent with how accelerator 335 of FIG. 3 may process entries in input file 1010 of FIG. 10, if keys 1020-1 and 1020-2 of FIG. 10 are not already sorted, may make a difference in how histogram 1025 of FIG. 10 is performed. (Alternatively, accelerator 335 of FIG. 3 may compare each entry with every key, regardless of the sort order, to identify the smallest key that is larger than the entry (or that the entry is larger than all keys), and then write the entry to a file corresponding to that identified smallest key.)

In FIGS. 12-15B, some embodiments of the disclosure are shown. But a person skilled in the art will recognize that other embodiments of the disclosure are also possible, by changing the order of the blocks, by omitting blocks, or by including links not shown in the drawings. All such variations of the flowcharts are considered to be embodiments of the disclosure, whether expressly described or not.

Embodiments of the disclosure offer technical advantages over the prior art. By performing merge, split, and histogram operations closer to the data, the time required to transfer files from the storage device to main memory, and back again after individual processing operations are complete, is avoided, resulting in potentially faster execution of such processing. In addition, by performing such processing closer to the data, the load on the host processor is reduced, permitting the host processor to carry out other processing instead.

The following discussion is intended to provide a brief, general description of a suitable machine or machines in which certain aspects of the disclosure may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present disclosure may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the disclosure may include a tangible, non-transitory machine-readable medium comprising instructions executable by one or more processors, the instructions comprising instructions to perform the elements of the disclosure as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the disclosure with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the disclosure" or the like are used herein, these phrases are meant to generally reference embodiment possibilities, and are not intended to limit the disclosure to particular embodiment configurations. As used herein, these terms may reference the same or different embodiments that are combinable into other embodiments.

The foregoing illustrative embodiments are not to be construed as limiting the disclosure thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this disclosure as defined in the claims.

Embodiments of the disclosure may extend to the following statements, without limitation:

Statement 1. An embodiment of the disclosure includes a system, comprising:

- a storage device, including:
  - storage for data; and
  - a controller to write the data to the storage and to read the data from the storage; and
- an accelerator implementing at least one operation on files stored on the storage device, the operations drawn from a set including a merge operation and a split operation.

Statement 2. An embodiment of the disclosure includes the system according to statement 1, wherein the at least one operation is drawn from the set further including a histogram operation.

Statement 3. An embodiment of the disclosure includes the system according to statement 1, wherein the at least one operation supports temporary table processing in a database query.

Statement 4. An embodiment of the disclosure includes the system according to statement 1, wherein the at least one operation includes an input of an identifier of an input file and an output of an output file.

Statement 5. An embodiment of the disclosure includes the system according to statement 4, wherein the at least one operation further includes the input of a second input file.

Statement 6. An embodiment of the disclosure includes the system according to statement 4, wherein the at least one operation further includes the input of at least one key.

Statement 7. An embodiment of the disclosure includes the system according to statement 4, wherein the at least one operation further includes the output of a second output file.

Statement 8. An embodiment of the disclosure includes the system according to statement 1, wherein the accelerator includes at least one of a Field Programmable Gate Array (FPGA), an Application-Specific Integrated Circuit (ASIC), a central processing unit (CPU), a Graphics Processing Unit (GPU), or a General Purpose GPU (GPGPU).

Statement 9. An embodiment of the disclosure includes the system according to statement 1, wherein the storage device includes a Solid State Drive (SSD).

Statement 10. An embodiment of the disclosure includes a method, comprising:

- receiving, at a storage device, an instruction from a host to execute an operation, the instruction including an identifier of an input file;
- accessing the input file stored on the storage device for the operation based at least in part on the identifier of the input file;
- executing the operation on the input file to produce an output file using an accelerator; and
- writing the output file on the storage device.

Statement 11. An embodiment of the disclosure includes the method according to statement 10, wherein the accelerator includes at least one of a Field Programmable Gate Array (FPGA), an Application-Specific Integrated Circuit (ASIC), a central processing unit (CPU), a Graphics Processing Unit (GPU), or a General Purpose GPU (GPGPU).

Statement 12. An embodiment of the disclosure includes the method according to statement 10, further comprising returning a result from the storage device to the host.

Statement 13. An embodiment of the disclosure includes the method according to statement 12, wherein the result includes an identifier of the output file.

Statement 14. An embodiment of the disclosure includes the method according to statement 10, wherein:

- receiving, at the storage device, the instruction from the host to execute the operation includes receiving, at a Solid State Drive (SSD) the instruction from the host to execute the operation;
- accessing the input file stored on the storage device for the operation based at least in part on the identifier of the input file includes accessing the input file stored on the SSD for the operation based at least in part on the identifier of the input file; and
- writing the output file on the storage device includes writing the output file on the SSD.

Statement 15. An embodiment of the disclosure includes the method according to statement 10, wherein the operation includes a merge operation.

Statement 16. An embodiment of the disclosure includes the method according to statement 15, wherein the merge operation includes combining the input file and a second input file into the output file.

Statement 17. An embodiment of the disclosure includes the method according to statement 16, wherein:

- the input file is sorted;
- the second input file is sorted; and
- the output file is sorted.

Statement 18. An embodiment of the disclosure includes the method according to statement 10, wherein the operation includes a split operation and an input of at least one key.

Statement 19. An embodiment of the disclosure includes the method according to statement 18, wherein the split operation includes separating the input file into the output file and a second output file based at least in part on the at least one key.

Statement 20. An embodiment of the disclosure includes the method according to statement 19, wherein:

a first entry in the output file is no larger than the at least one key; and a second entry in the second output file is larger than the at least one key.

Statement 21. An embodiment of the disclosure includes the method according to statement 10, wherein the operation includes a histogram operation, an input of at least a first key and a second key, and an output of at least the output file, a second output file, and a third output file.

Statement 22. An embodiment of the disclosure includes the method according to statement 21, wherein the histogram operation includes separating the input file into the output file, the second output file, and the third output file based at least in part on the at least the first key and the second key.

Statement 23. An embodiment of the disclosure includes the method according to statement 22, wherein:

a first entry in the output file is no larger than the first key;

a second entry in the second output file is larger than the first key and no larger than the second key; and a third entry in the third output file is larger than the second key.

Statement 24. An embodiment of the disclosure includes the method according to statement 22, further comprising sorting the at least the first key and the second key.

Statement 25. An embodiment of the disclosure includes an article, comprising a non-transitory storage medium, the non-transitory storage medium having stored thereon instructions that, when executed by a machine, result in:

receiving, at a storage device, an instruction from a host to execute an operation, the instruction including an identifier of an input file;

accessing the input file stored on the storage device for the operation based at least in part on the identifier of the input file;

executing the operation on the input file to produce an output file using an accelerator; and writing the output file on the storage device.

Statement 26. An embodiment of the disclosure includes the article according to statement 26, wherein the accelerator includes at least one of a Field Programmable Gate Array (FPGA), an Application-Specific Integrated Circuit (ASIC), a central processing unit (CPU), a Graphics Processing Unit (GPU), or a General Purpose GPU (GPGPU).

Statement 27. An embodiment of the disclosure includes the article according to statement 25, the non-transitory storage medium having stored thereon further instructions that, when executed by the machine, result in returning a result from the storage device to the host.

Statement 28. An embodiment of the disclosure includes the article according to statement 27, wherein the result includes an identifier of the output file.

Statement 29. An embodiment of the disclosure includes the article according to statement 25, wherein:

receiving, at the storage device, the instruction from the host to execute the operation includes receiving, at a Solid State Drive (SSD) the instruction from the host to execute the operation;

accessing the input file stored on the storage device for the operation based at least in part on the identifier of the input file includes accessing the input file stored on the SSD for the operation based at least in part on the identifier of the input file; and writing the output file on the storage device includes writing the output file on the SSD.

Statement 30. An embodiment of the disclosure includes the article according to statement 25, wherein the operation includes a merge operation.

Statement 31. An embodiment of the disclosure includes the article according to statement 30, wherein the merge operation includes combining the input file and a second input file into the output file.

Statement 32. An embodiment of the disclosure includes the article according to statement 31, wherein:

the input file is sorted;

the second input file is sorted; and the output file is sorted.

Statement 33. An embodiment of the disclosure includes the article according to statement 25, wherein the operation includes a split operation and an input of at least one key.

Statement 34. An embodiment of the disclosure includes the article according to statement 33, wherein the split operation includes separating the input file into the output file and a second output file based at least in part on the at least one key.

Statement 35. An embodiment of the disclosure includes the article according to statement 34, wherein:

a first entry in the output file is no larger than the at least one key; and a second entry in the second output file is larger than the at least one key.

Statement 36. An embodiment of the disclosure includes the article according to statement 25, wherein the operation includes a histogram operation, an input of at least a first key and a second key, and an output of at least the output file, a second output file, and a third output file.

Statement 37. An embodiment of the disclosure includes the article according to statement 36, wherein the histogram operation includes separating the input file into the output file, the second output file, and the third output file based at least in part on the at least the first key and the second key.

Statement 38. An embodiment of the disclosure includes the article according to statement 37, wherein:

a first entry in the output file is no larger than the first key;

a second entry in the second output file is larger than the first key and no larger than the second key; and a third entry in the third output file is larger than the second key.

Statement 39. An embodiment of the disclosure includes the article according to statement 37, the non-transitory storage medium having stored thereon further instructions that, when executed by the machine, result in sorting the at least the first key and the second key.

Consequently, in view of the wide variety of permutations to the embodiments described herein, this detailed description and accompanying material is intended to be illustrative only, and should not be taken as limiting the scope of the disclosure. What is claimed as the disclosure, therefore, is all such modifications as may come within the scope and spirit of the following claims and equivalents thereto.

What is claimed is:

1. A system, comprising:

a storage device, including:

storage for data; and a controller to write the data to the storage and to read the data from the storage based on temporary tables; and an accelerator implementing an operation on a file stored on the storage device and managed under a file system based at least in part on a pre-ordered file name or a key value.

2. The system according to claim 1, wherein the operation is drawn from the set including a merge operation, a split operation, or a histogram operation.

3. The system according to claim 2, wherein the accelerator implements at least two of the merge operation, the split operation, or the histogram operation.

4. The system according to claim 1, wherein the temporary table processing is based at least in part on in a database query.

5. The system according to claim 1, wherein the operation operates on the input file name and generates an output file.

6. The system according to claim 5, wherein the operation is based at least in part on the key value and a second key value.

7. The system according to claim 5, wherein the operation further generates a second output file.

8. The system according to claim 1, wherein the accelerator includes at least one of a Field Programmable Gate Array (FPGA), an Application-Specific Integrated Circuit (ASIC), a central processing unit (CPU), a Graphics Processing Unit (GPU), or a General Purpose GPU (GPGPU).

9. A method, comprising:

receiving, at a storage device, an instruction from a host to execute an operation, on a temporary table stored on the storage device, the operation based at least in part on a pre-ordered file name or a key value;

accessing a file stored on the storage device and managed under a file system for the operation;

executing the operation on the temporary table to generate an output file using an accelerator; and writing the output file on the storage device.

10. The method according to claim 9, further comprising returning a result from the storage device to the host.

11. The method according to claim 10, wherein the result includes a second pre-ordered file name associated with the output file.

12. The method according to claim 9, wherein:

the input file is associated with the pre-ordered file name; and the operation includes a merge operation to combine the input file and a second input file associated with a second pre-ordered file name into the output file.

13. The method according to claim 9, wherein the operation includes a split operation to separate the input file into the output file and a second output file based at least in part on the key value.

14. The method according to claim 13, wherein:

a first entry in a second temporary table stored in the output file is no larger than the key value; and a second entry in a third temporary table stored in the second output file is larger than the key value.

15. The method according to claim 9, wherein:

the operation includes a histogram operation; and executing the operation on the temporary table to generate the output file using the accelerator includes executing the operation on the temporary table to generate the output file, a second output file, and a third output file using the accelerator based at least in part on the key value and a second key value.

16. The method according to claim 15, wherein the histogram operation includes separating the input file into the output file, the second output file, and the third output file based at least in part on the key value and the second key value.

17. The method according to claim 16, further comprising sorting the key value and the second key value.

18. The method according to claim 9, wherein the accelerator implements the operation and a second operation, the operation a first of a merge operation, a split operation, or a histogram operation, the second operation a second of the merge operation, the split operation, and the histogram operation, and the operation is different from the second operation.

19. An article, comprising a non-transitory storage medium, the non-transitory storage medium having stored thereon instructions that, when executed by a machine, result in:

receiving, at a storage device, an instruction from a host to execute an operation, on a temporary table stored on the storage device, the operation based at least in part on a pre-ordered file name or a key value;

accessing a file stored on the storage device and managed under a file system for the operation;

executing the operation on the temporary table to generate an output file using an accelerator; and writing the output file on the storage device.

20. The article according to claim 19, wherein the operation includes a merge operation, a split operation, or a histogram operation.

* * * * *